United States Patent [19]

Kuwana et al.

[11] Patent Number: 5,576,894
[45] Date of Patent: Nov. 19, 1996

[54] ZOOM LENS BARREL BASED ON THE VARI-FOCAL OPTICAL SYSTEM

[75] Inventors: Minoru Kuwana, Osaka; Masaaki Miyano, Sakai; Masayuki Miyazawa, Kawachinagano; Masayuki Ueyama, Takarazuka; Shinichi Suzuki, Izumiootsu, all of Japan

[73] Assignee: Minolta Co., Ltd., Osaka, Japan

[21] Appl. No.: 325,075

[22] Filed: Oct. 19, 1994

[30] Foreign Application Priority Data

Oct. 21, 1993 [JP] Japan .................................. 5-263367
Jul. 29, 1994 [JP] Japan .................................. 6-196179

[51] Int. Cl.⁶ .............................. G02B 15/14; G02B 7/02
[52] U.S. Cl. .................... 359/701; 359/700; 359/696; 359/823; 359/824
[58] Field of Search ........................ 359/699, 700, 359/701, 822, 823, 824, 696, 825

[56] References Cited

U.S. PATENT DOCUMENTS

| | | | |
|---|---|---|---|
| 3,972,056 | 7/1976 | Tsujimoto | 359/698 |
| 4,961,635 | 10/1990 | Kondo | 359/701 |
| 5,018,843 | 5/1991 | Inadome | 359/700 |
| 5,115,267 | 5/1992 | Kondo | 354/221 |
| 5,159,370 | 10/1992 | Takahashi | 354/195.12 |
| 5,182,591 | 1/1993 | Kawasaki | 354/195.1 |
| 5,198,847 | 3/1993 | Takahashi | 354/195.12 |
| 5,223,877 | 6/1993 | Kawasaki | 354/286 |
| 5,281,796 | 1/1994 | Kaneda | 359/698 |
| 5,347,333 | 9/1994 | Takahashi | 354/187 |

FOREIGN PATENT DOCUMENTS

| | | |
|---|---|---|
| 57-37307 | 3/1982 | Japan . |
| 63-49715 | 3/1988 | Japan . |
| 3-101707 | 4/1991 | Japan . |
| 144411 | 6/1991 | Japan .................... 359/701 |
| 4-69070 | 3/1992 | Japan . |
| 4-184406 | 7/1992 | Japan . |
| 5-107439 | 4/1993 | Japan . |

Primary Examiner—Georgia Y. Epps
Assistant Examiner—Ricky Mack
Attorney, Agent, or Firm—Burns, Doane, Swecker & Mathis, LLP

[57] ABSTRACT

A zoom lens barrel based on the vari-focal optical system includes a zoom cam ring which is supported only rotatably about the optical axis and a focus cam ring which is supported movably only in the axial direction both fitted on a fixed tube inside a lens barrel. For the alteration of the lens focal length, the zoom cam ring is turned to carry out zooming, and for the focusing of an object, the focus cam ring is moved in the axial direction to carry out focusing, thereby preventing the interference between zooming and focusing caused by the movement of the lens sets. A drive mechanism based on a piezo-electric element is used to move the focus cam ring in the axial direction, thereby simplifying the structure and reducing the weight.

16 Claims, 21 Drawing Sheets

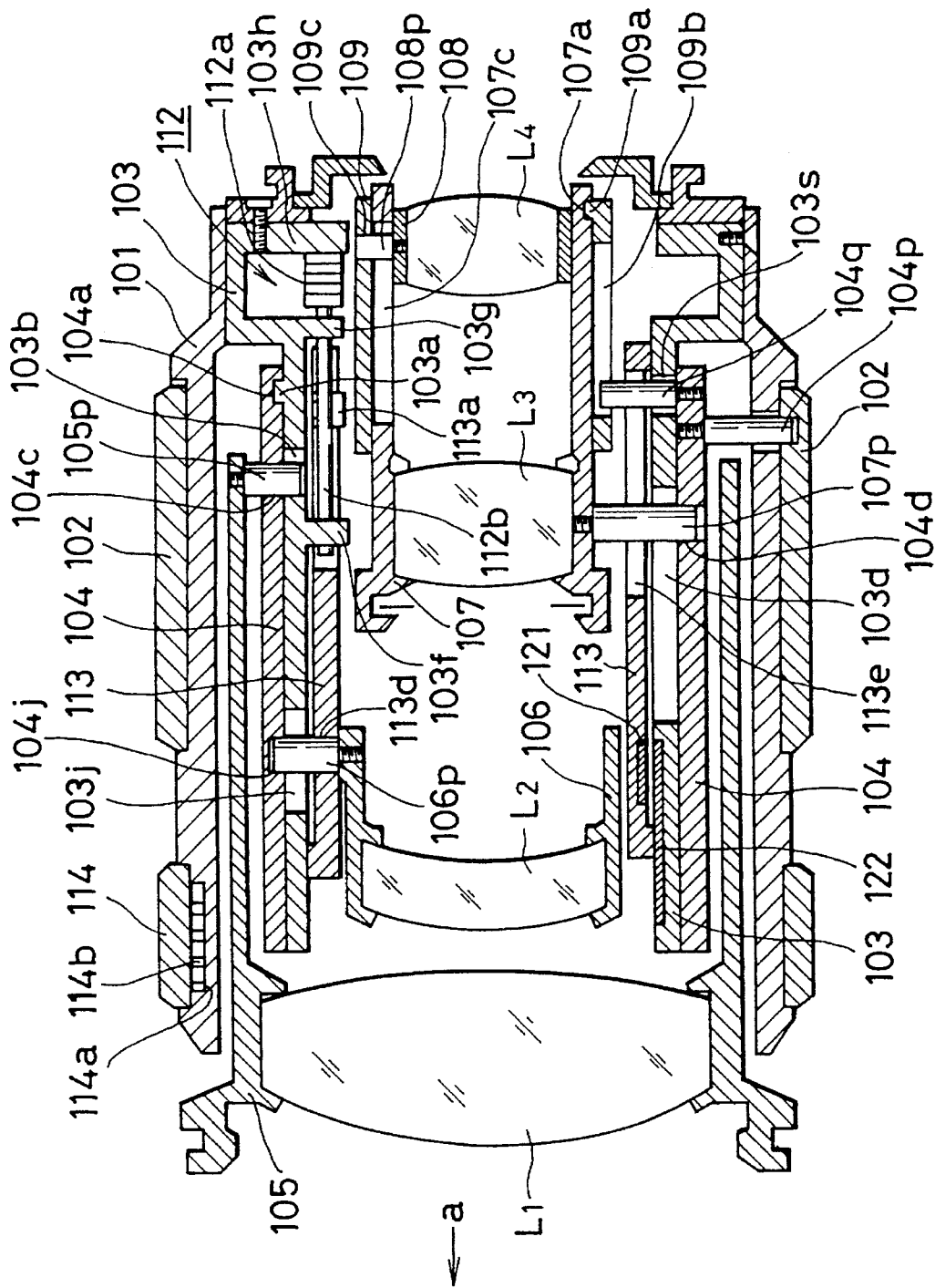

ZOOM LENS BARREL BASED ON THE VARI-FOCAL OPTICAL SYSTEM

BACKGROUND OF THE INVENTION

1. Field of the Invention

The present invention relates to a zoom lens barrel based on the vari-focal optical system, and particularly to the improvement of the drive mechanism of the focusing optical system of the zoom lens barrel.

2. Description of the Prior Art

A zoom lens barrel based on the vari-focal optical system is intended to cease the exclusive use of the zooming lens set and focusing lens set equipped in the lens barrel, but use the zooming lens set also for focusing so that the zoom ratio is extended and focusing for a very short object distance is made possible.

However, a zoom lens barrel of this type has a different amount of displacement of the focusing optical system in the zooming operation to match with the variation of focal length between the telephoto and wide-angle positions in focusing the same object of photography.

On this account, the turn angle of the distance ring in the manual focusing operation varies unfavorably depending on the focal length.

With the intention of overcoming the above-mentioned problem, there have been proposed focusing techniques in which the operational range of the focusing cam contribution to the displacement of the focusing optical system is varied in response to the variation of focal length caused by the zooming operation, as described in Japanese patent publications JP-A-57-37307, JP-A-63-49715 and JP-A-4-184406 for example.

Any of these conventional techniques, however, cannot be rid of the occurrence of interference between the zooming and focusing mechanisms, i.e., the focusing mechanism is moved by a zooming operation. Although there has been developed a device for preventing the interference between the zooming and focusing mechanisms by using an ultrasonic motor for the auto-focusing driver so that the drive mechanism is locked after the manual focusing operation, the mechanism becomes too complex and cannot dissolve the problem completely.

With the intention of preventing the interference between the zooming mechanism and focusing mechanism in a mechanical manner, another Japanese patent publication JP-A-3-101707 discloses a zoom lens barrel of one-hand zooming type in which the focusing operation takes place by the combination of the zoom cam and focus cam.

This prior art zoom lens barrel is designed to confine the movement of the lens set, which contributes to zooming and focusing, at the intersection of the zoom cam and focus cam. Zooming is based on the relative rotation of the cams and focusing is based on the axial movement of the cams so that the relative movement of the cams at focusing is maintained virtually constant with respect to a specific object irrespective of the focal length. The zoom cam is formed on the fixed tube, while the focus cam is formed as a cam ring which couples with the fixed tube rotatably and also movably in the axial direction.

The zoom ring provided at the outermost circumference of the lens barrel is moved in the axial direction for zooming, and the distance ring provided at the same section is turned for focusing. The operating angle of the distance ring is kept constant over the range from the wide-angle position to the telephoto position at focusing.

However, the foregoing conventional lens barrels, in which the zoom cam is formed on the fixed tube, have the following problems.

The fixed tube is generally formed as a unitary member together with a bayonet for the attachment of the lens barrel to the camera body, with cam rings and moving lens holders for holding the lens sets being mounted on its interior and exterior. On this account, this component part is bulky and complex, and thus costly for manufacturing.

In the case of a fixed tube formed by metal cutting, a sophisticated machining technique is required to form a precise zoom cam, and poor yield of products is expected. In the case of an injected fixed tube, its metal mold inclusive of the zoom cam section will be very complex and expensive.

SUMMARY OF THE INVENTION

A prime object of the present invention is to provide a zoom lens barrel based on the vari-focal optical system having an improved drive mechanism for the focusing system.

Another object of the present invention is to provide a zoom lens barrel based on the vari-focal optical system having a zooming optical system which varies the lens focal length, a focal point adjusting optical system which implements focusing, and a drive mechanism which moves the focal point adjusting optical system in response to the movement of the zooming optical system.

These and other objects and novel features of the present invention will become more apparent from the following detailed description taken in conjunction with the accompanying drawings.

BRIEF DESCRIPTION OF THE DRAWINGS

FIG. 14 is a cross-sectional diagram showing the zoom lens barrel based on a fourth embodiment of this invention;

DETAILED DESCRIPTION OF THE PREFERRED EMBODIMENTS

The embodiments of this invention will be explained in detail with reference to the drawings.

Embodiment 1

Figure 1:
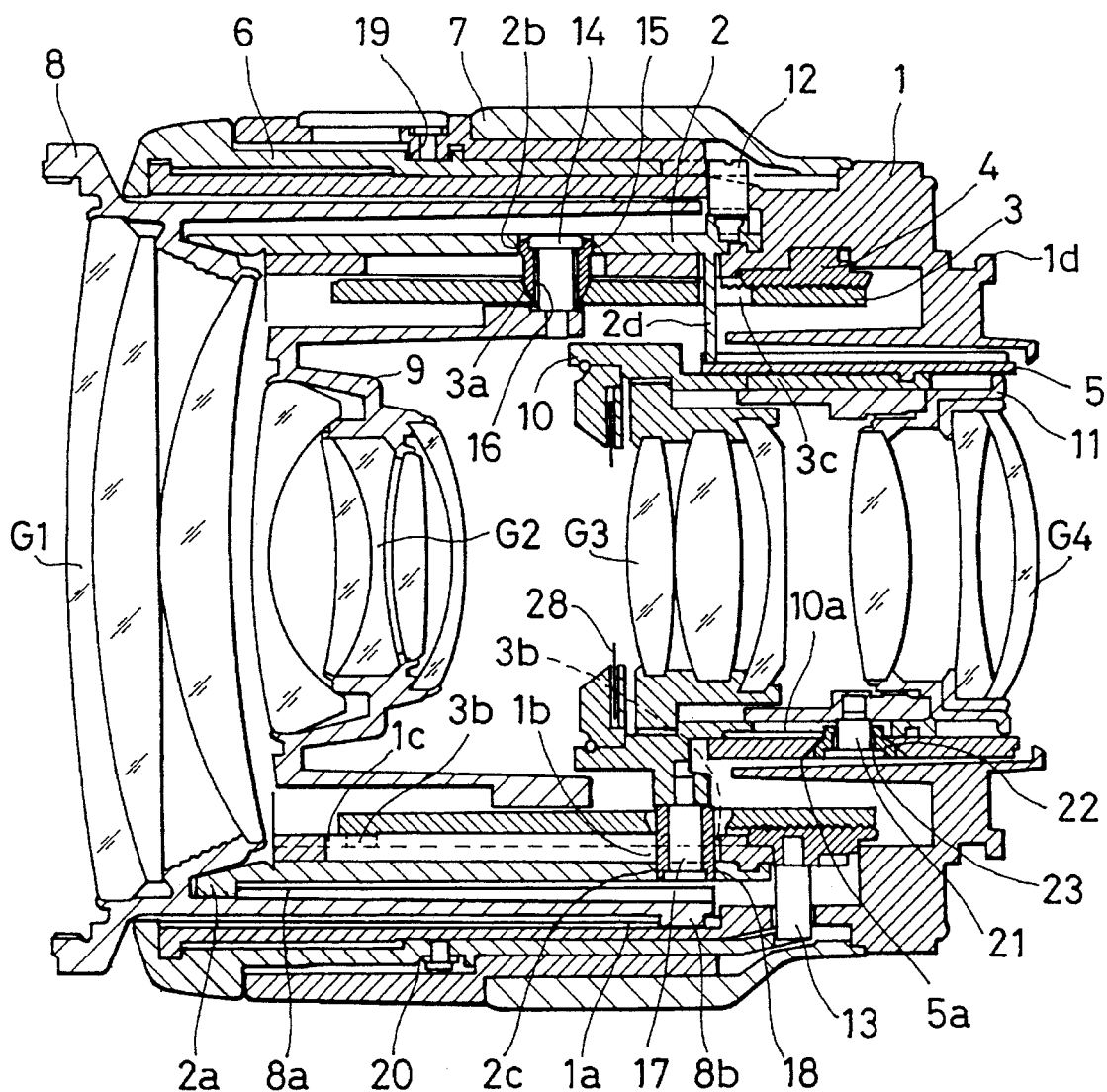
FIG. 1 is a cross-sectional diagram showing the zoom lens barrel based on a first embodiment of this invention, with the lens focal length being set to the wide-angle position.
Figure 2:
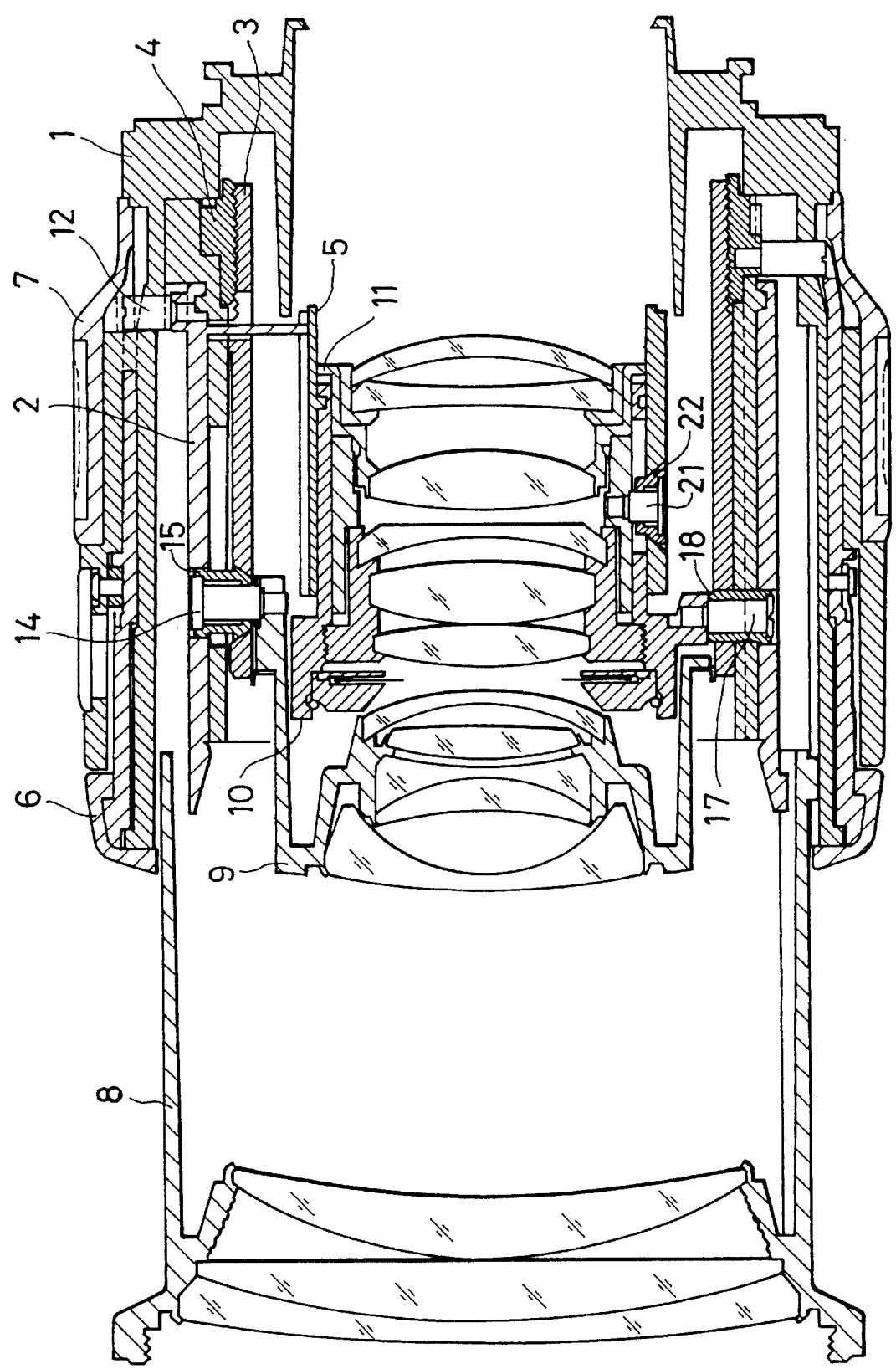
FIG. 2 is a cross-sectional diagram showing the zoom lens barrel of the first embodiment, with the lens focal length being set to the telephoto position.
Figure 3:
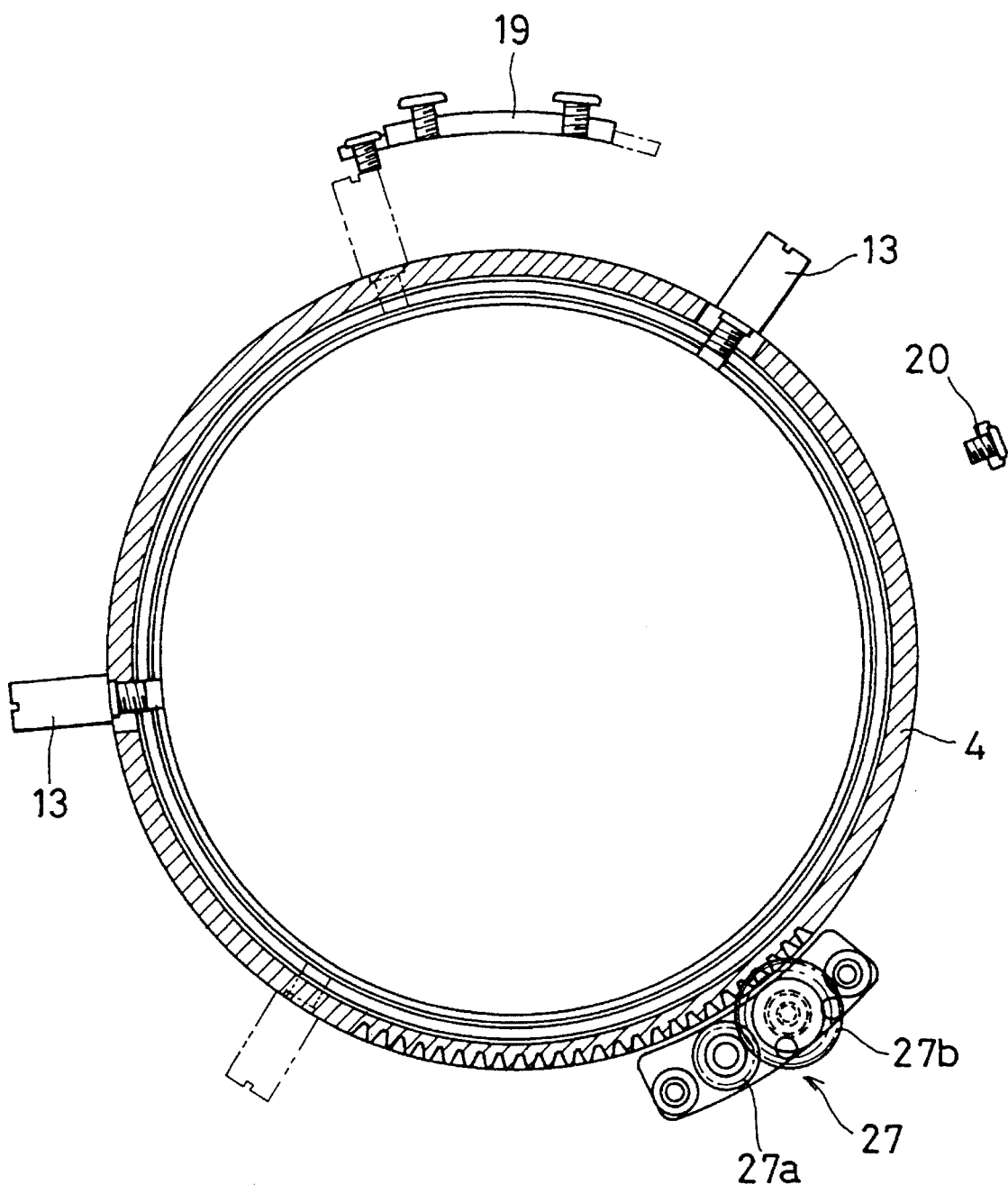
FIG. 3 is a front view of the focus cam ring driver of the zoom lens barrel of the first embodiment.
Figure 4:
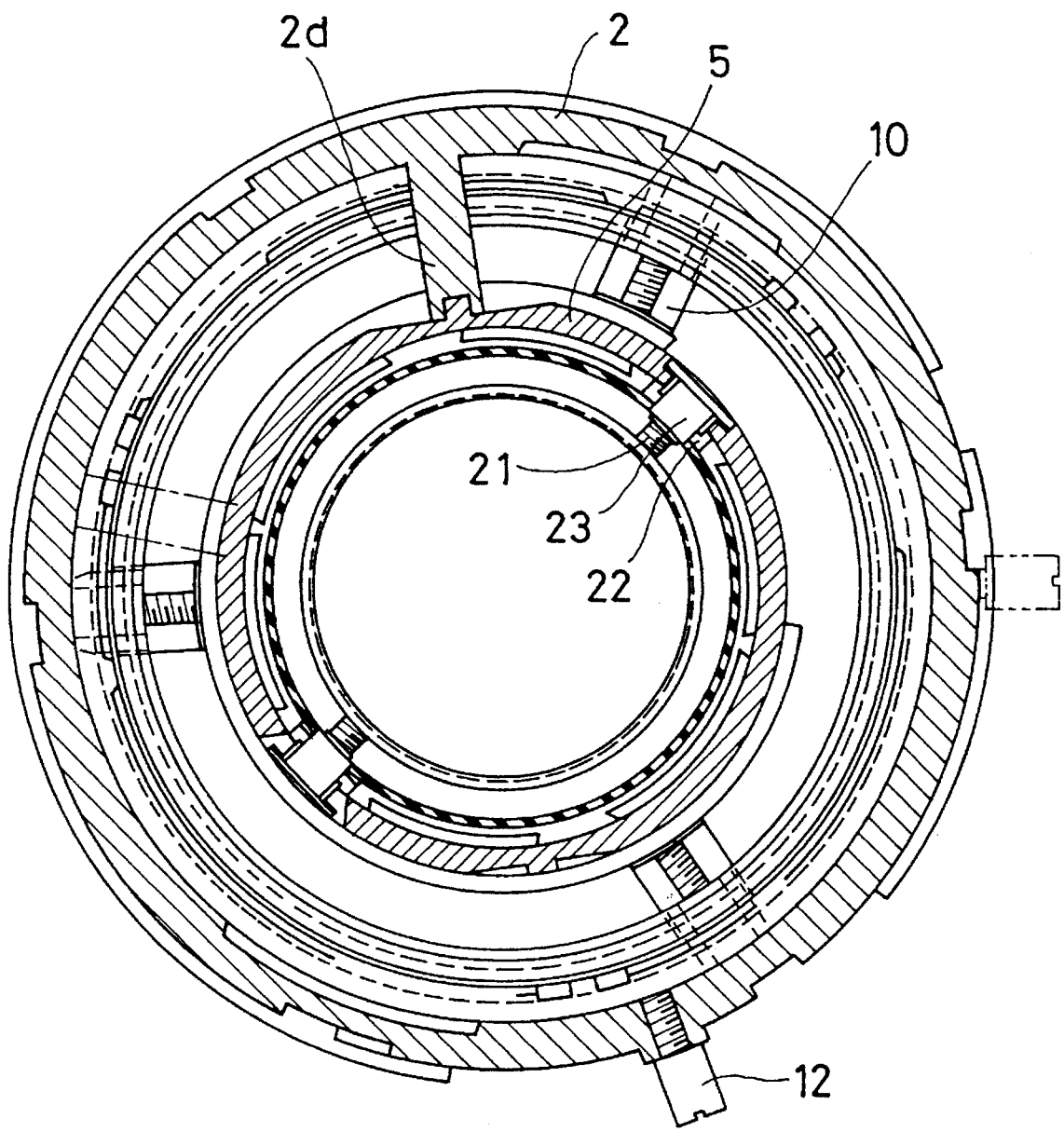
FIG. 4 is a front view of the zoom cam ring driver of the zoom lens barrel of the first embodiment.
Figure 5:
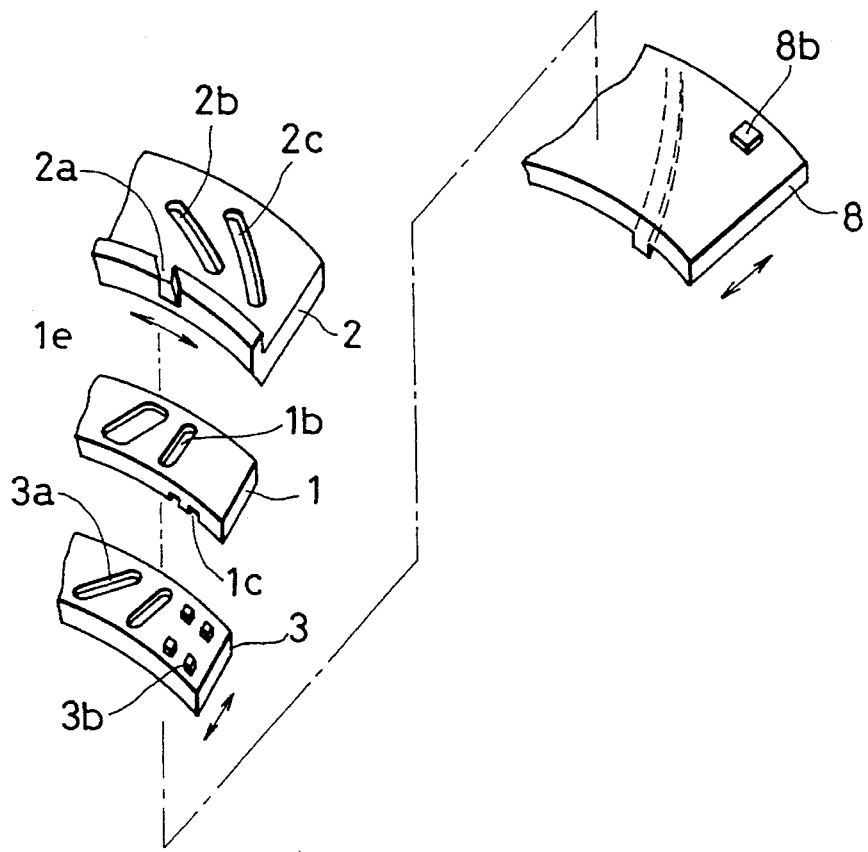
FIG. 5 is a perspective diagram showing the positional relation among the fixed tube, zoom cam ring and focus cam ring of the zoom lens barrel of the first embodiment.

FIG. 1 through FIG. 7 show the first embodiment of this invention. FIG. 1 shows the cross section of the zoom lens barrel, with the lens focal length being set to the wide-angle extreme, and FIG. 2 shows the lens barrel, with the lens focal length being set to the telephoto extreme. FIG. 3 shows the focus cam ring driver, and FIG. 4 shows the zoom cam ring driver. FIG. 5 shows the positional relation among the fixed tube 1, zoom cam ring 2 and focus cam ring 3 which constitute the lens barrel.

In these figures, the fixed tube 1 has at the rear end thereof the integral formation of a bayonet 1d which functions to attach the lens barrel to the camera body. A zoom cam ring 2 couples on the outer side of the fixed tube 1 by being only rotatable and stopped in the axial direction by the fixed tube 1.

On the inner side of the fixed tube 1, there is fitted a focus cam ring 3, which is movable only in the axial direction and cannot turn. Specifically, the focus cam ring 3 has on the outer side thereof the formation of a protrusion 3b, which engages with an axial groove 1c formed in the interior wall of the fixed tube 1, and it is moved only in the axial direction and cannot turn.

A helicoid tube 4 is supported only rotatably with respect to the zoom cam ring 2, with a helicoid screw formed in the interior wall thereof being in engagement with the focus cam ring 3. Indicated by 5 is a zoom cam ring for a lens set G4, and it links with the zoom cam ring 2 through a lug 2d extending from the zoom cam ring 2 toward the interior through a hole 3c formed in the focus cam ring 3.

A manual focus ring 6 used for the manual focusing operation is provided in the front section of the outermost circumference of the lens barrel, and it engages with a focus linkage pin 13 protruding toward the exterior of the helicoid tube 4. A manual zoom ring 7 used for the manual zooming operation is provided in the rear section of the outermost circumference of the lens barrel, and it engages with a zoom linkage pin 12 protruding at the rear section of the outermost circumference of the zoom cam ring 2.

Indicated by 8, 9, 10 and 11 are lens holders which hold the lens sets G1, G2, G3 and G4, respectively. The lens holder 8 of the lens set G1 has the formation of a lead protrusion 8a on the inner side and a protrusion 8b at the rear end on the outer side so that the lead protrusion 8a engages with a claw-shaped protrusion 2a formed on the outer side of the zoom cam ring 2 and the protrusion 8b engages with the axial groove 1a formed on the inner side of the fixed tube 1.

The lens holder 9 of the lens set G2 is provided in its rear end section on the outer side with a guide pin 14 for G2, which protrudes through the cam groove 2b as a zoom cam formed in the zoom cam ring 2 and the cam groove 3a as a focus cam formed in the focus cam ring 3. Indicated by 15 is a guide roller which couples rotatably with the guide pin 14 of the lens set G2, and 16 is a guide spring which is fitted in the gap between the guide pin 14 and guide roller 15 of G2.

The lens holder 10 of the lens set G3 is provided on the outer side thereof with a guide pin 17 for G3, which protrudes through the cam groove 2c as a zoom cam formed in the zoom cam ring 2 and the axial groove 1b formed in the fixed tube 1. Indicated by 18 is a guide roller which couples rotatably with the guide pin 17 of G3.

The lens holder 11 of the lens set G4 is provided on the outer side thereof with a guide pin 21 for G4, which protrudes through the cam groove 5a as a zoom cam formed in the zoom cam ring 5 for G4 and the axial groove 10a formed on the outer side of the lens holder 10 of G3. Indicated by 22 is a guide roller which couples rotatably with the guide pin 21 of G4, and 16 is a guide spring which is fitted in the gap between the guide pin 21 and guide roller 22 of G4.

Figure 6:
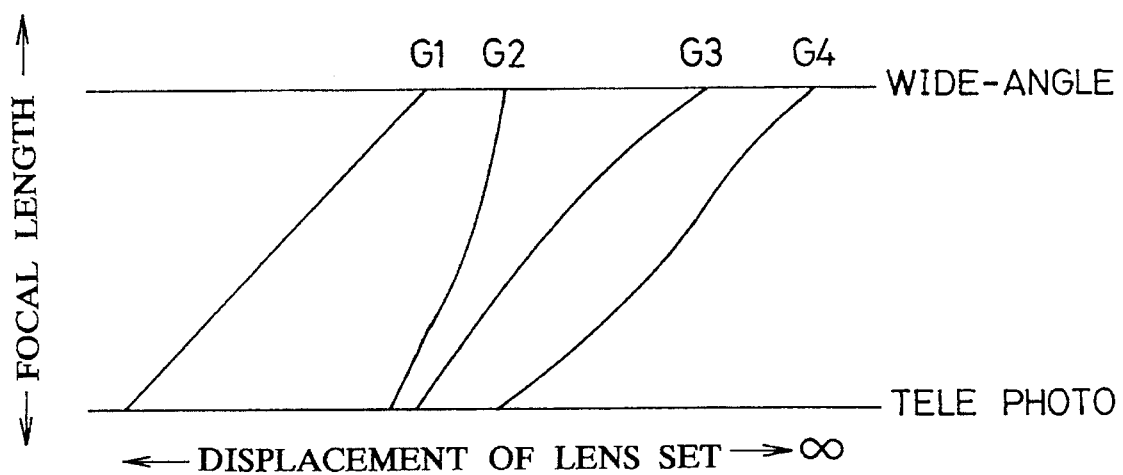
FIG. 6 is a diagram showing the loci of movement of the lens sets in the zoom lens barrel of the first embodiment during the zooming operation.

In the foregoing arrangement of the zoom lens barrel, the lens sets G1–G4 have loci of movement during the zooming operation as shown in FIG. 6, with the second lens set G2 mainly contributing to focusing. The lens holder 10 of G3 is equipped with an aperture mechanism 28. In the figure, the zoom setting angle θ (plotted on the vertical coordinate) and the axial movement (horizontal coordinate) are set such that the locus of movement of the first lens set G1 is a straight line at 45° with the optical axis during the zooming operation.

Indicated by 19 is a focus stopper which is screwed to the fixed tube 1, and 20 is a focus stopper ring which is screwed to the manual focus ring 6 to confine the rotational range of the manual focus ring 6.

FIG. 3 is a front view of the zoom lens barrel with a distance setting of infinity. For a new setting of the closest distance from this state, the helicoid tube 4 is turned counterclockwise until the focus stopper ring 20 comes in contact with the focus stopper 19.

Further indicated by 27 in FIG. 3 is a focus reduction gear set which functions as AF drive transmission means for converting the rotational drive of the auto-focusing motor (not shown) equipped in the camera body into the axial movement of the focus cam ring 3. The gear set 27 consists of a gear 27a with a smaller diameter that couples with the output shaft of the lens coupler which is driven by the coupler of the camera body in the auto-focusing operation and a gear with a larger diameter that engages with the transmission gear 4a formed on the outer side of the helicoid tube 4.

Next, the operation of the foregoing arrangement will be explained.

First, focusing of the vari-focal optical system will be explained prior to the detailed operation of the arrangement. The zoom lens barrel of this embodiment forms the vari-focal optical system through the adoption of internal focusing (based on the second lens set G2) as mentioned previously, so that the amount of displacement of the second lens set G2 from its certain distance position to another certain distance position varies depending on the zoom position, i.e., the focal length. With the embodiment, it functions as a usual zoom lens through the mechanical correction based on the devised cam shape. The correction is as follows.

Figure 7A:
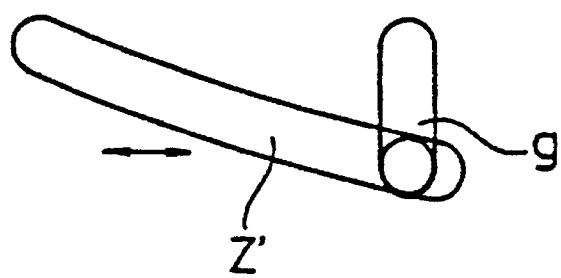
FIG. 7(a) is a diagram explaining the shape of the cam grooves of the zoom cam ring and focus cam ring of the conventional zoom lens barrel.
Figure 7B:
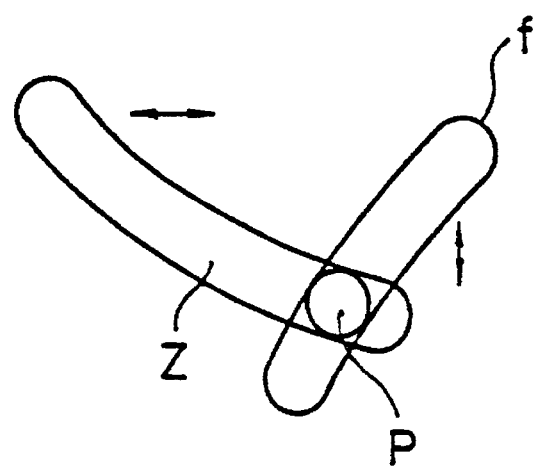
FIG. 7(b) is a diagram explaining the shape of the cam grooves of the zoom cam ring and focus cam ring of the inventive zoom lens barrel.
Figure 8:
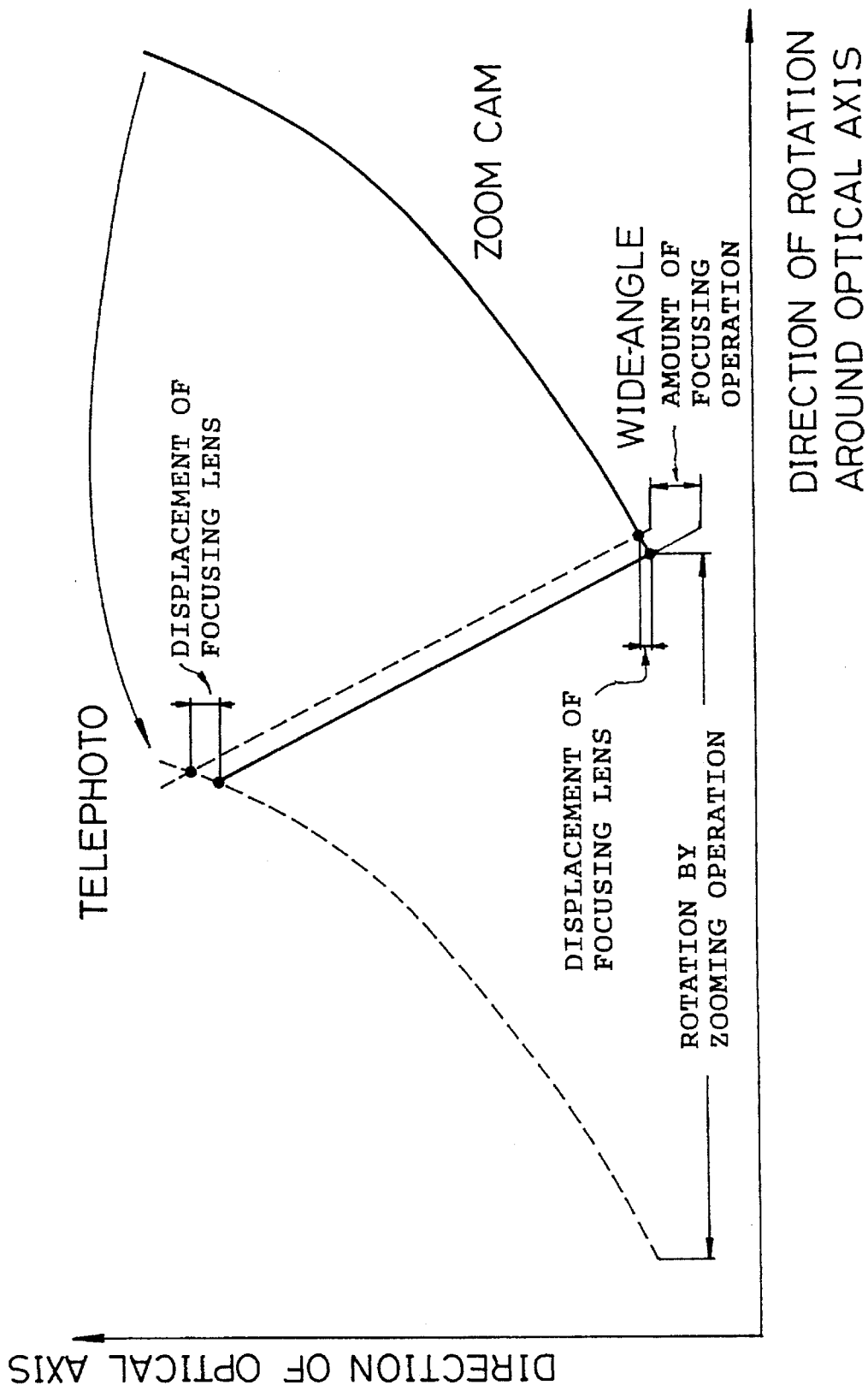
FIG. 8 is a conceptual diagram explaining the movement of the zoom cam and focus cam of the zoom lens barrel.

A typical zoom lens barrel adopts the combination of a usual curved zoom cam z' and an axial groove g coupled with a linkage pin P as shown in FIG. 7(a), whereas that of this embodiment of invention adopts the combination of a curved zoom cam z and a curved focus cam f coupled with a linkage pin P as shown in FIG. 7(b) and the focus cam f is moved axially for the focusing operation. While the zoom cam z is rotated for the zooming operation.

In the focusing operation, the amount of displacement of the second lens set G2 from its infinity position for a certain photographic object varies depending on the zoom position. With the present embodiment, the cam shape is determined in advance such that the displacement of the focus cam ring 3 from its infinity position to a certain distance position is invariable regardless of the zoom position. Consequently, the turning angle of the distance ring for drawing out the focus cam ring 3 becomes invariable independently of the zoom position as in the case of the usual zoom lens. However, perfection cannot be expected in the above mentioned mechanical correction over the entire zoom and focus ranges due to unavoidable approximation in designing the cam shape.

Next, the detailed operation of this embodiment will be explained.

For the zooming operation, the manual zoom ring 7 is turned by hand. This rotation is transmitted to the zoom cam ring 2 through the zoom linkage pin 12. As the zoom cam ring 2 turns, the torque is transmitted by the engagement of the claw-shaped protrusion 2a with the lead protrusion 8a of the lens holder 8 of the lens set G1, with the protrusion 8b of the lens holder 8 being movable only axially by the axial groove 1a of the fixed tube 1, and accordingly the lens holder 8 of G1 is driven in the axial direction.

The rotation of the zoom cam ring 2 is further transmitted from the cam groove 2b to the guide pin 14 of the lens set G4, causing the guide pin 14 to move along the optical axis by being guided by the cam groove 3a of the focus cam ring 3a, and consequently the lens holder 9 of the lens set G2 is turned. The rotation of the zoom cam ring 2 is further transmitted from the cam groove 2c to the guide pin 17 of G3, causing the guide pin 17 to move axially by being guided by the axial groove 1b of the fixed tube 1, and consequently the lens holder 10 of the lens set G3 is driven in the axial direction.

At the same time, the rotation of the zoom cam ring 2 is transmitted from the lug 2d to the zoom cam ring 5 for the lens set G4. When the zoom cam ring 5 of G4 turns, the guide pin 21 of G4 receives the torque from the cam groove 5a of the zoom cam ring 5 of G4, causing it to move in the axial direction by being guided by the axial groove 10a of the lens holder 10 of G4, and consequently the lens holder 11 of the lens set G4 is driven in the axial direction. In this case, the zoom cam ring 5 of G4 is supported only rotatably by being stopped in the axial direction with respect to the lens holder 10 of G3. The cam groove 5a is shaped to match the difference of movement between the lens holder 10 of G3 and the lens holder 11 of G4.

FIG. 4 shows the zoom driver, with the lens focal length being set to the wide-angle position. For the zooming operation toward the telephoto position, the zoom cam ring 2 is turned counterclockwise.

Next, the focusing operation will be explained. For the manual focusing operation, the manual focus ring 6 is turned by hand, and the rotation is transmitted to the helicoid tube 4 through the focus linkage pin 13. Since the helicoid tube 4 is supported only rotatably with respect to the zoom cam ring 2, the turning helicoid tube 4 drives the focus cam ring 3 based on its helicoid screw.

At this time, the focus cam ring 3 is driven only axially due to the engagement of the protrusion 3b with the internal axial groove 1c of the fixed tube 1. The axial movement of the focus cam ring 3 is transmitted from the cam groove 3a to the guide pin 14 of the lens set G2, causing the guide pin 14 to turn and move in the axial direction by being guided by the cam groove 2b of the zoom cam ring 2, and consequently the lens holder 9 of the lens set G2 is driven axially while turning.

In the auto-focusing operation, the torque of the lens coupler, which is driven by the coupler on the part of the camera body, is transmitted to the helicoid tube 4 by the focus reduction gear train 27. Thereafter, the drive force is transmitted from the helicoid tube 4 to the focus linkage pin 13, to the focus cam ring 3, to the guide pin 14 of G2, and to the lens holder 9 of G2, in the same manner as the manual focusing operation.

Embodiment 2

Figure 9:
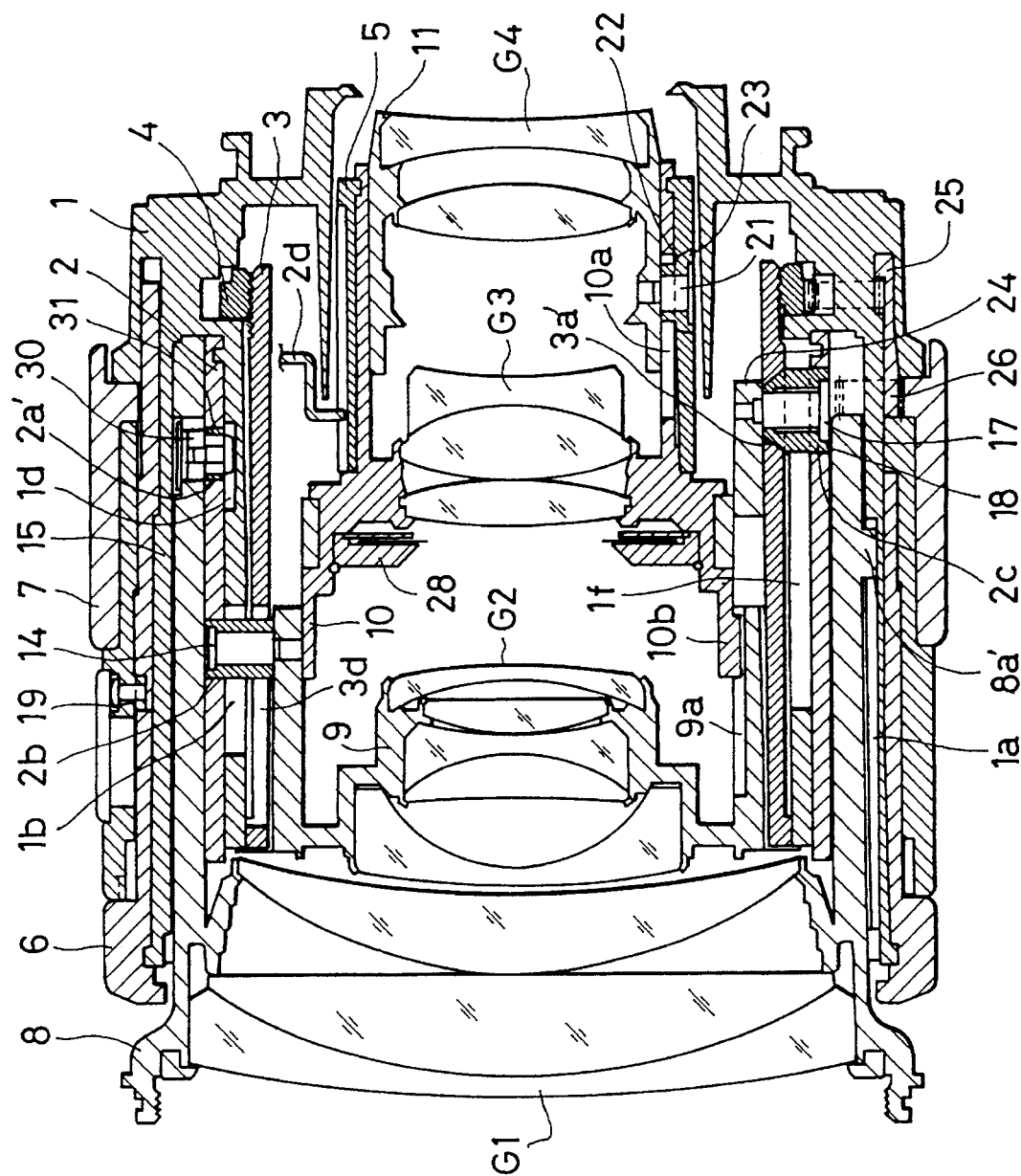
FIG. 9 is a cross-sectional diagram showing the zoom lens barrel based on a second embodiment of this invention, with the lens focal length being set to the wide-angle position.
Figure 10A:
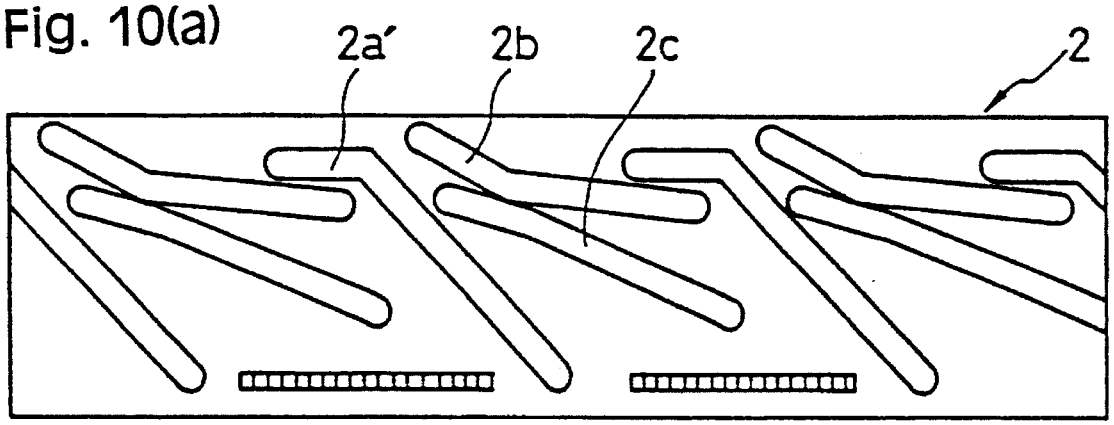
FIGS. 10(a), 10(b) and 10(c) are diagrams showing by developing the shape of the zoom cam ring and focus cam ring of the zoom lens barrel based on the second embodiment.
Figure 10B:
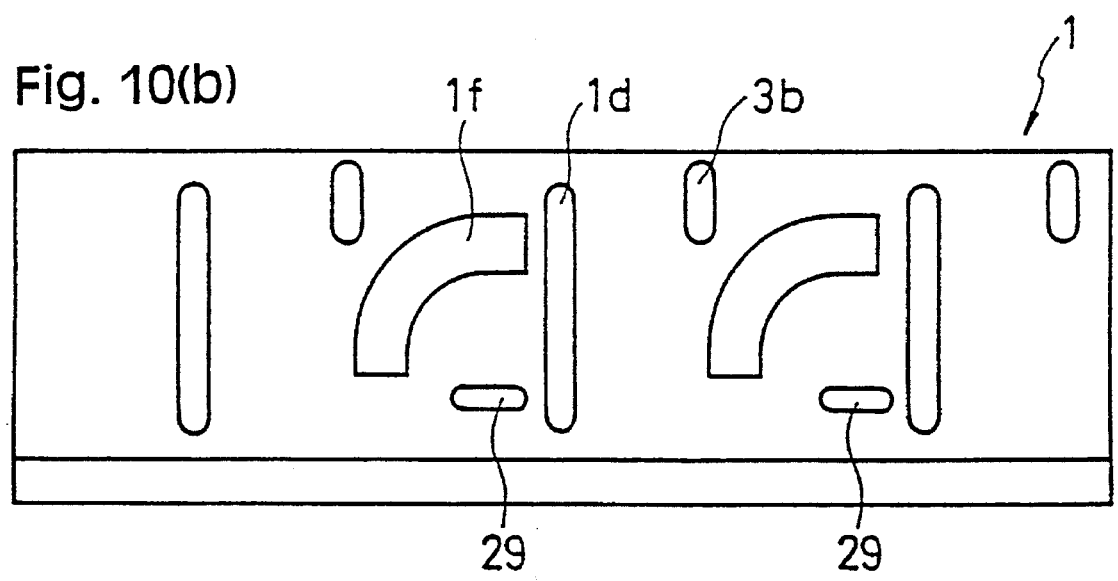
Figure 10C:
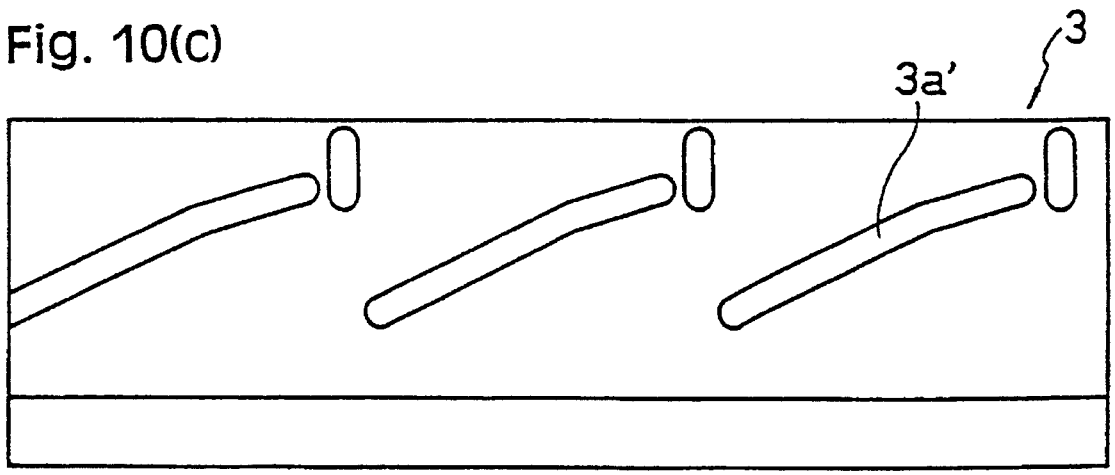
Figure 11:
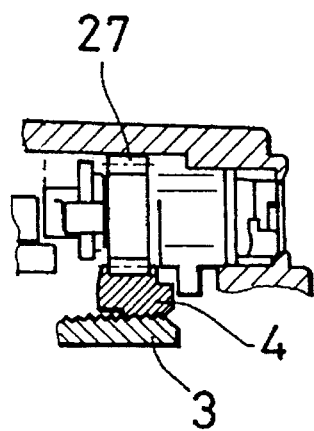
FIG. 11 is a cross-sectional diagram of the lens coupler of the zoom lens barrel of the second embodiment.

FIG. 9 through FIG. 11 show the second embodiment of this invention. FIG. 9 shows the cross section of the zoom lens barrel, with the lens focal length being set to the wide-angle extreme, and FIGS. 10(a), 10(b), and 10(c) show by developing the shape of cams formed on the fixed tube 1, zoom cam ring 2 and focus cam ring 3. Component parts identical to those of the preceding first embodiment are referred to by the common symbols, and explanation thereof will not be repeated.

Among the lens sets G1–G4 of this embodiment, G3 and G4 mainly contribute to focusing. The aperture mechanism 28 is provided on the lens holder 10 of G3 as in the preceding embodiment. In this case, however, it is devised such that the lens holders 10 and 11 of G3 and G4 do not turn so as to prevent their rotation from disturbing the mechanical linkage with the aperture control system on the part of the camera body.

Specifically, a slider 24 is interposed between the focus cam ring 3 and the lens holder 10 of G3, with the guide pin 17 of G3 being arranged to extend through the slider 24. The slider 24 of G3 is moved in the axial direction while being turned by the cam groove 2c of the zoom cam ring 2 and the cam groove 3a' of the focus cam ring 3. The lens holder 10 of G3 is supported only rotatably with respect to the slider 24.

The lens holder 10 of G3 has at the front end on the outer side thereof the formation of a cam 10b, which engages with an axial groove 9a formed on the inner side of the lens holder 9 of G2. Accordingly, the lens holder 10 of G3 is guided axially with respect to the lens holder 9 of G2 by the engagement of the cam 10b with the axial groove 9a, and consequently the lens holder 10 of G3 is driven axially without rotation.

The manual zoom ring 7 and zoom cam ring 2 have a linkage through a zoom linkage gear 26 which is interposed between the gears provided at the rear end on the inner side of the manual zoom ring 7 and the rear end on the outer side of the zoom cam ring 2. The manual focus ring 6 and helicoid tube 4 have a linkage through a focus linkage ring 25 which is interposed between the focus gear train (not shown) provided at the rear end on the inner side of the manual focus ring 6 and the rear end on the outer side of the helicoid tube 4.

The zoom cam ring 2 has the formation of a cam groove 2a' which corresponds to the claw-shaped protrusion 2a of the first embodiment, as shown in FIG. 10(a). The lens holder 8 of G1 has at the rear end on the outer side thereof a protrusion 8a' which corresponds to the lead protrusion 8a of the first embodiment, and a guide pin 30 of G1 protruding to the interior engages with the cam groove 2a', with the protrusion 8a' meshing with the axial groove 1a of the fixed tube 1. Indicated by 31 is a guide roller which couples rotatably with the guide pin 30 of G1.

The guide pin 14 of G2 provided on the lens holder 9 of G2 runs through the cam groove 2b formed in the zoom cam ring 2 and the axial groove 1b formed in the fixed tube 1 through a axial groove 3d formed in the focus cam ring 3. The guide pin 17 of G3 provided on the slider 24 of G3 runs through the cam groove 2c formed in the zoom cam ring 2, a relief groove 1f formed in the fixed tube 1 and the cam groove 3a' formed in the focus cam ring 3.

Next, the detailed operation of this embodiment will be explained. For the zooming operation, the manual zoom ring 7 is turned by hand. The rotation of the ring 7 is transmitted to the zoom cam ring 2 through the zoom linkage gear 26. Based on the transmission of rotation through the gear train including the one 26, the fixed tube 1 can have its formation of a cut 29 (shown in FIG. 10) minimized in size, in contrast to the first embodiment in which the zoom linkage pin 12 is used and the cut formed in the fixed tube 1 must be large enough to cover its moving range against the intention of compact design.

As the zoom cam ring 2 turns, the rotation is transmitted to the guide pin 30 of G1 through the cam groove 2a', with the protrusion 8a' of the lens holder 8 of G1 being movable only axially due to the axial groove 1a of the fixed tube 1, and accordingly the lens holder 8 of G1 is driven in the axial direction. The rotation of the zoom cam ring 2 is further transmitted from the cam groove 2b to the guide pin 14 of G2, causing the guide pin 14 to move along the optical axis by being guided only axially by the axial groove 1b of fixed tube 1, and consequently the lens holder 9 of G2 is driven axially.

The rotation of the zoom cam ring 2 is further transmitted from the cam groove 2c to the guide pin 17 of G3, causing the guide pin 17 to turn and move in the axial direction by being guided by the cam groove 3a' of the focus cam ring 3, and consequently the slider 24 of G3 comes out while turning. At this time, the lens holder 10 of G3, which is supported only rotatably with respect to the slider 24 of G3, is guided axially with respect to the lens holder 9 of G2 by the cam 10b and axial groove 9a, and consequently the lens holder 10 of G3 is driven axially without rotation.

At the same time, the rotation of the zoom cam ring 2 is transmitted from the lug 2d to the zoom cam ring 5 for the lens set G4. When the zoom cam ring 5 turns, the guide pin 21 of G4 receives the torque from the cam groove 5a of the zoom cam ring 5 of G4, causing it to move in the axial direction by being guided by the axial groove 10a of the lens holder 10 of G4, and consequently the lens holder 11 of G4 is driven in the axial direction.

Next, the focusing operation will be explained. When the manual focus ring 6 is turned by hand, the rotation is transmitted to the focus linkage ring 25, and further transmitted to the helicoid tube 4 through the focus gear train. The turning helicoid tube 4 drives the focus cam ring 3 based on its helicoid screw.

Since the focus cam ring 3 is guided by the engagement of its axial groove 3d with the guide roller 15 of lens set G2, it is driven axially without rotation with respect to the fixed tube 1. The axial driving of the focus cam ring 3 is transmitted from the cam groove 2c of the zoom cam ring 2 and the cam groove 3a' to the guide pin 17 of G3, and consequently the slider 24 of G3 comes out while turning.

The lens holder 10 of lens set G3 is supported only rotatably with respect to the slider 24 of G3, and therefore it is guided axially by the cam 10b and axial groove 9a with respect to the lens holder 9 of G2. Accordingly, the lens holder 10 of G3 is driven axially without rotation.

In the auto-focusing operation, the torque of the lens coupler, which is driven by the coupler on the part of the camera body, is transmitted by the focus reduction gear 27 to the helicoid tube 4 as shown in FIG. 11, and thereafter the focus cam ring 3 is driven in the same manner as the manual focusing operation.

Embodiment 3

Figure 13:
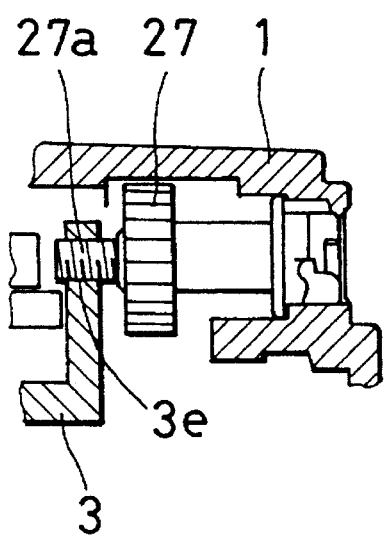
FIG. 13 is a cross-sectional diagram of the lens coupler of the zoom lens barrel of the third embodiment.
Figure 12:
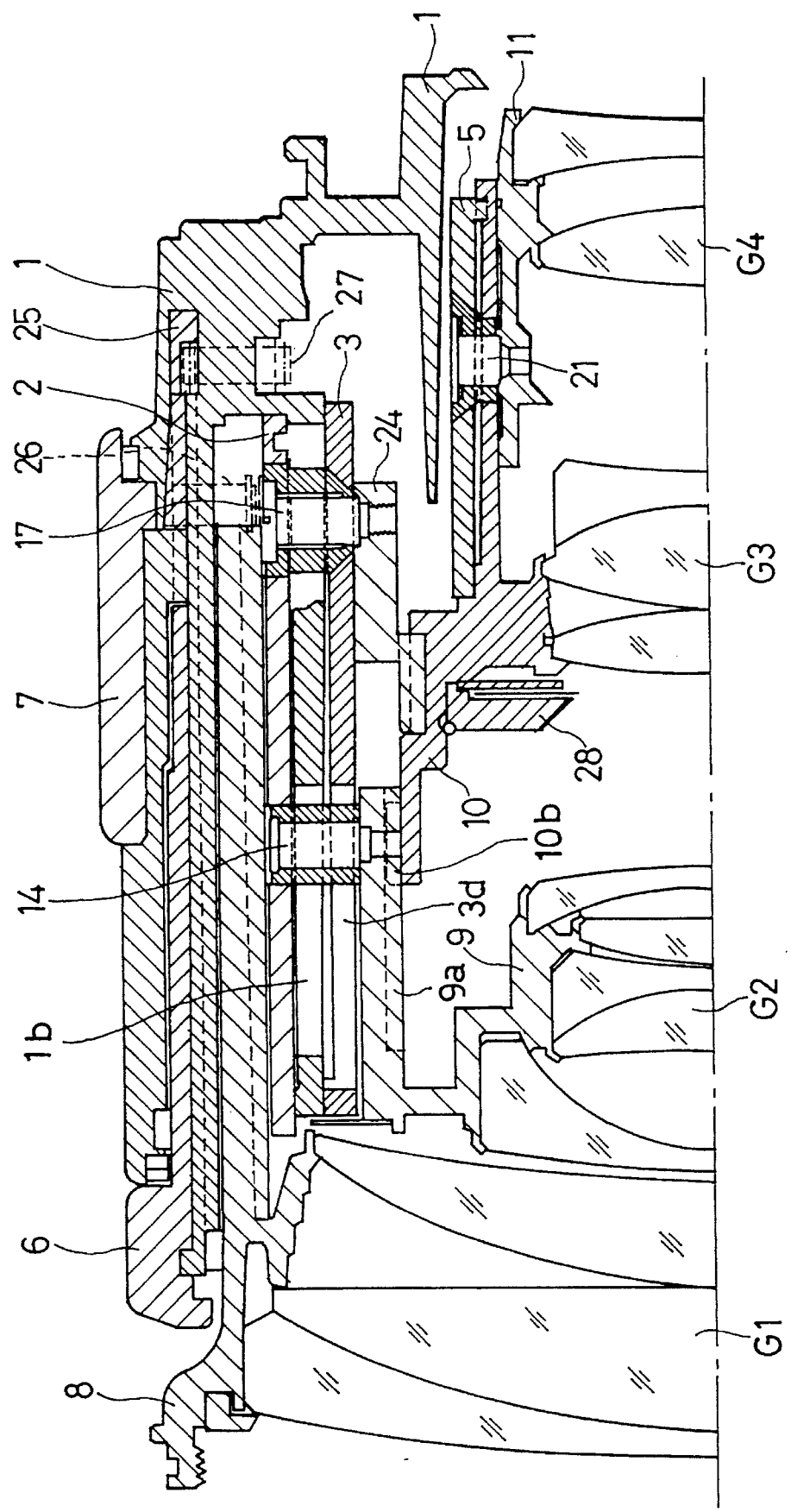
FIG. 12 is a cross-sectional diagram showing the zoom lens barrel based on a third embodiment of this invention, with the lens focal length being set to the wide-angle position.

FIG. 12 and FIG. 13 show the third embodiment of this invention, of which FIG. 12 shows the cross section of the lens barrel, with the lens focal length being set to the wide-angle extreme. In FIG. 12, component parts identical to those of the preceding embodiments are referred to by the common symbols, and explanation thereof will not be repeated. This embodiment is basically identical to the preceding second embodiment, with the difference being that the focus cam ring 3 is driven by means of a feed screw 27a provided coaxially with the focus reduction gear 27 as shown in FIG. 13. The feed screw 27a meshes with a male screw 3e formed at the rear end of the focus cam ring 3.

The zooming operation of this embodiment is the same as the preceding second embodiment.

Next, the focusing operation will be explained. When the manual focus ring 6 is turned by hand, the rotation is transmitted to the focus linkage ring 25, and the focus reduction gear 27 turns. The rotation of the focus reduction gear 27 is transmitted to the focus cam ring 3 by the engagement of the feed screw 27a with the male screw 3e of the focus cam ring 3.

Since the focus cam ring 3 is guided by the engagement of its axial groove 3d with the guide roller 1b of lens set G2, it is driven axially without rotation with respect to the fixed tube 1. The axial driving of the focus cam ring 3 is transmitted from the cam groove 2c of the zoom cam ring 2 and the cam groove 3a' to the guide pin 17 on the lens holder 10 of lens set G3, and consequently the slider 24 of G3 comes out while turning.

The lens holder 10 of G3 is supported only rotatably with respect to the slider 24 of G3, and therefore it is guided axially by the cam 10b and axial groove 9a with respect to the lens holder 9 of G2. Accordingly, the lens holder 10 of G3 is driven axially without rotation.

In the auto-focusing operation, the torque of the lens coupler, which is driven by the coupler on the part of the camera body, is transmitted to the focus reduction gear 27 to turn it. Thereafter, the focus cam ring 3 is driven in the same manner as the manual focusing operation. The auto-focusing motor, which is equipped on the part of the camera body, may be equipped on the part of the lens barrel.

Embodiment 4

(1) General Construction

Figure 15:
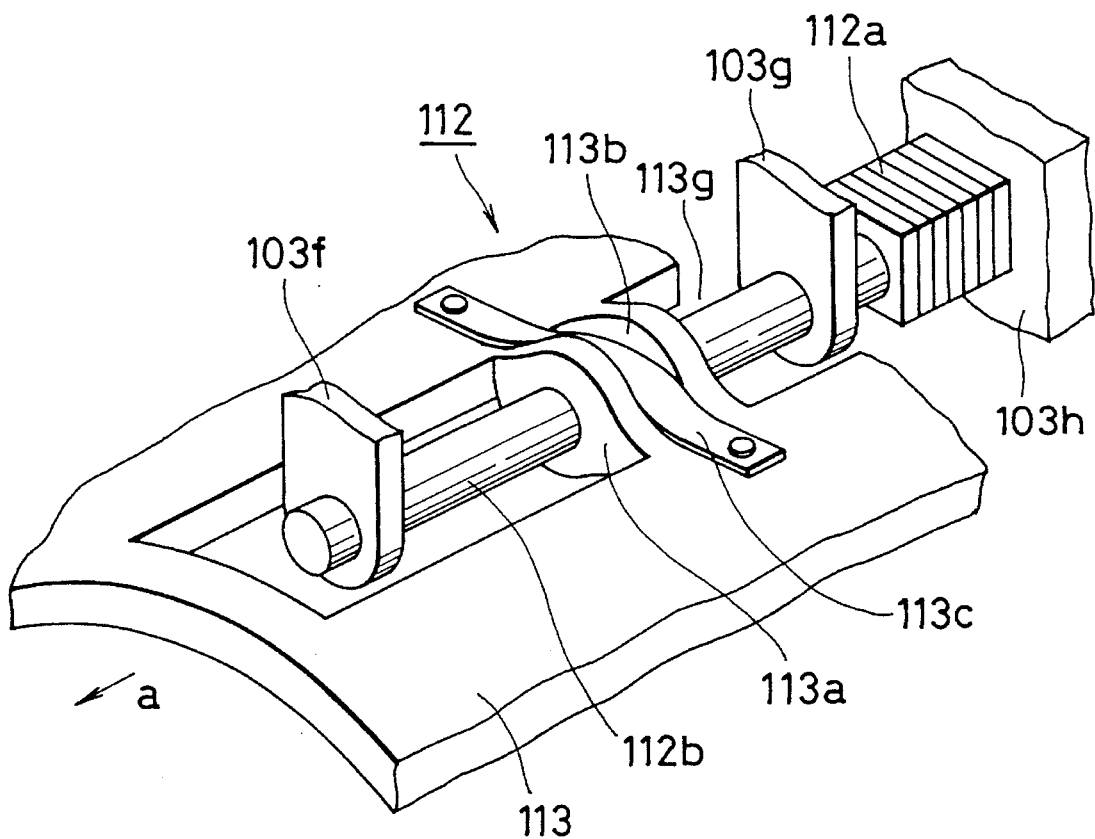
FIG. 15 is a perspective diagram showing the drive mechanism section of the zoom lens barrel shown in FIG. 14.

FIG. 14 and FIG. 15 show the zoom lens barrel based on the fourth embodiment of this invention, of which FIG. 14 is a cross-sectional view taken along the optical axis of the lens barrel, and FIG. 15 is a perspective view of the drive mechanism which is based on a piezo-electric actuator.

In FIG. 14, indicated by 101 is an outer lens tube, 102 is a zoom ring which is fitted rotatably around the outer lens tube 101, and 103 is an inner fixed tube which is fixed to the tube 101. A zoom cam ring 104 is fitted around the inner fixed tube 103. Formed at one end of the zoom cam ring 104 is an annular groove 104a, which engages with an annular protrusion 103a formed around the inner fixed tube 103 so that the zoom cam 104 is supported only rotatably around the inner fixed tube 103, and it is not moved to the optical axis direction.

The zoom lens consists of a first through fourth lens sets L1, L2, L3 and L4, which are held by lens holders 105, 106, 107 and 108, respectively. Provided at one end of the zoom cam ring 104 is a pin 104b, which engages with the zoom ring 102, and the rotation of the zoom ring 102 is transmitted to the zoom cam ring 104. A pin 105p, which is provided on the holder 105 of the first lens set L1 by being located at the intersection of the cam groove 104c of the zoom cam ring 104 and the axial groove 103b of the inner fixed tube 103, runs through the zoom cam ring 104 and engages with the axial groove 103b of the inner fixed tube 103. Based on this arrangement, the turning zoom cam ring 104, which is driven by the operation of the zoom ring 102, moves the pin 105p along the axial groove 103b of the inner fixed tube 103, and the first lens set L1 held by the holder 105 is moved in the axial direction.

The holder 107 of the third lens set L3 has a pin 107p, which runs through a groove 113e of focus cam ring 113 (will be explained shortly), further runs through an axial groove 103d of the inner fixed tube 103, and engages with a cam groove 104d of the zoom cam ring 104. Based on this arrangement, the turning zoom cam ring 104 moves the pin 107p along the axial groove 103d of the inner fixed tube 103, and the third lens set L3 held by the holder 107 is moved in the axial direction.

A zoom cam ring 109 is fitted around the holder 107 of the third lens set L3. Formed at one end of the zoom cam ring 109 is an annular protrusion 109a, which engages with an annular groove 107a formed around the holder 107 so that the zoom cam ring 109 is supported rotatably around holder 107 and movable together with the holder 107 in the axial direction.

A pin 104q, which is provided at one end of the zoom cam ring 104, runs through a slit 103s of the inner fixed tube 103 and engages with an axial groove 109b of the zoom cam ring 109, and consequently the rotation of the zoom cam ring 104 is transmitted to the zoom cam ring 109 to turn it. The holder 108 of the fourth lens set L4 has a pin 108p, which runs through an axial groove 107c of the holder 107 of L3 and engages with a cam groove 109c of the zoom cam ring 109.

Based on this arrangement, the rotation of the zoom cam ring 104 is transmitted to the zoom cam ring 109 through the pin 104q, and the rotation of the zoom cam ring 109 moves the pin 108p of the holder 108 of L4 along the axial groove 107c. Consequently, the fourth lens set L4 is moved in the axial direction with respect to the holder 107. The rotation of the zoom cam ring 104 also moves the third lens set L3 held by the holder 107 in the axial direction as mentioned previously.

A piezo-electric actuator 112, which drives the focus cam ring 113, is disposed at one end of the inner fixed tube 103. The arrangement of the piezo-electric actuator 112 will be explained with reference to FIG. 14 and FIG. 15. The inner fixed tube 103 has in it two support members 103f and 103g, which supports a drive shaft 112b movably in the axial direction. A piezo-electric element 112a has its one end glued to the end of the drive shaft 112b and another end glued to a flange 103h of the inner fixed tube 103. A variation of thickness of the piezo-electric element 112a cause the drive shaft 112b to have a displacement in the axial direction.

The focus cam 113 has the formation of a cutout portion 113g in its right-hand section, and a contactor 113a through which the drive shaft 112b runs is formed near the center of the cutout portion 113g as shown in FIG. 15. The contactor 113a has the formation of a cut 113b through which the drive shaft 112b is exposed, and a flat spring 113c is disposed to bridge the cut 113b over the drive shaft 112b. The drive shaft 112b and flat spring 113c are in press contact and the drive shaft 112b and contactor 113a are also in press contact so that these members are joined to each other based on the friction.

Figure 16:
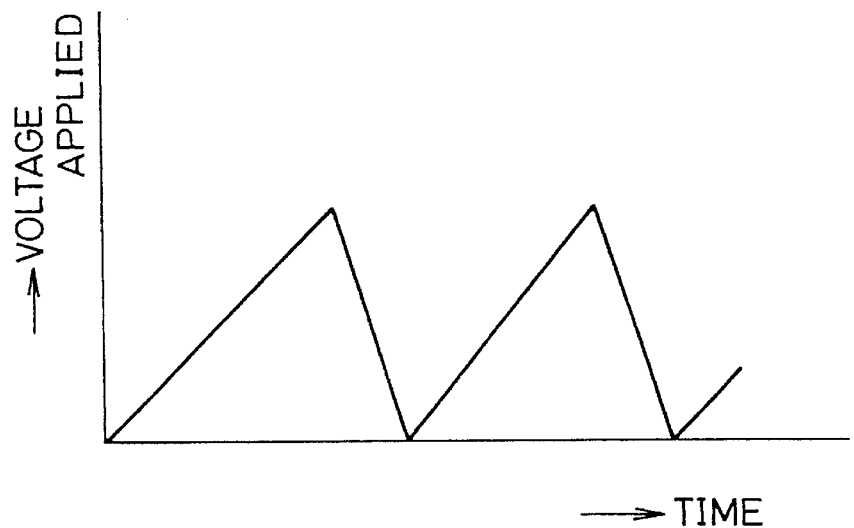
FIG. 16 is a diagram showing an example of the waveform of drive pulses applied to the piezo-electric actuator.

The piezo-electric element 112a is supplied with electric drive pulses having a moderate rising edge and a sharp falling edge as shown in FIG. 16, and a resulting increase of thickness causes the drive shaft 112b to have a displacement in the axial direction. Consequently, the focus cam ring 113, which is joined by friction at the contactor 113a to the drive shaft 112b, is moved in the axial direction as shown by the arrow mark a. The focus cam ring 113 is moved in the opposite direction when drive pulses having a sharp rising edge and a moderate falling edge are supplied to the piezo-electric element 112a.

The holder 106 of the second lens set L2 has a pin 106p, which runs through a cam groove 113d of the focus cam ring 113, further runs through an axial groove 103j of the inner fixed tube 103, and engages with a cam groove 104j of the zoom cam ring 104.

The piezo-electric actuator 112 is activated in response to the defocus value detected by the focus detecting device on the part of the camera body or the operation value of the manual focus ring to move the focus cam ring 113 in the axial direction. Consequently the pin 106p, which runs through the cam groove 113d of the focus cam ring 113, moves the lens holder 106 in the axial direction, causing the second lens set L2 to move in the axial direction by a distance corresponding to the detected defocus value, and it is brought to the in-focus position.

The lens holder 106, which is linked to the zoom cam ring 104 by the pin 106p, also moves in the axial direction, and the second lens set L2 can be moved in the axial direction also by the rotation of the zoom cam ring 104 in response to the zooming operation.

The zoom lens barrel based on this embodiment will further be explained in the following.

(2) Adjustment of Focusing

Figure 17:
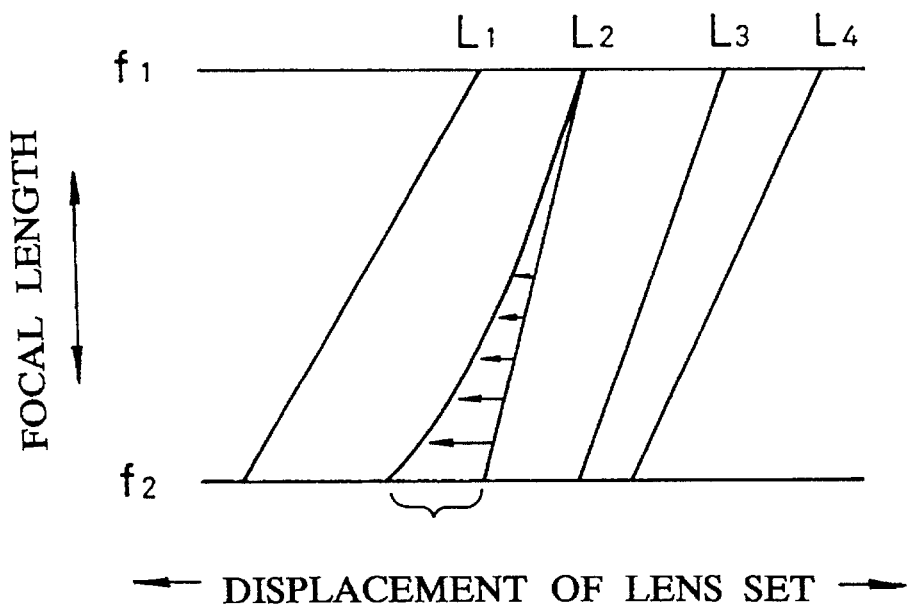
FIG. 17 is a diagram showing the loci of movement of the lens sets which constitute a zoom lens.

FIG. 17 shows the loci of movement of the first through fourth lens sets L1–L4 during the zooming operation. Each lens set moves in response to the variation of the setup focal length f from the wide-angle extreme f1 to the telephoto extreme f2 as shown.

The adjustment of focusing is achieved by varying the amount of displacement of second lens set L2 in nonlinear fashion during the zooming operation in accordance with the focal length f and the object distance D that are set for the lens.

Figure 18:
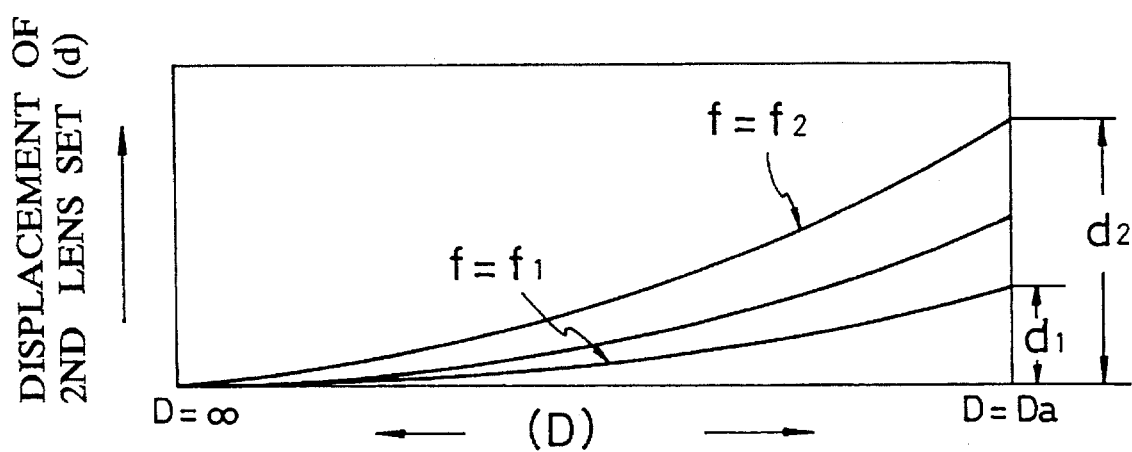
FIG. 18 is a diagram explaining the relationship among the focal length and object distance set for the second lens set and the amount of displacement of the lens set.

FIG. 18 shows the relationship among the setup focal length f and object distance D and the displacement d of the second lens set L2. The closer the object distance to the closest setup position and the closer the setup focal length f to the telephoto position, the greater is the displacement d. Specifically, with the object distance being at the closest position (D=Da), when the focal length f is set to the wide-angle extreme f1, the displacement d is equal to d1, or when the f is set to the telephoto extreme f2, the d is equal to d2.

The shape of the cam groove 104j of the zoom cam ring 104 and the shape of the cam groove 113d of the focus cam ring 113 which move the second lens set L2, and the movement of the pin 106p which is located at the intersection of the grooves 104j and 113d will be explained in connection with the developing diagram of FIG. 19.

Figure 19:
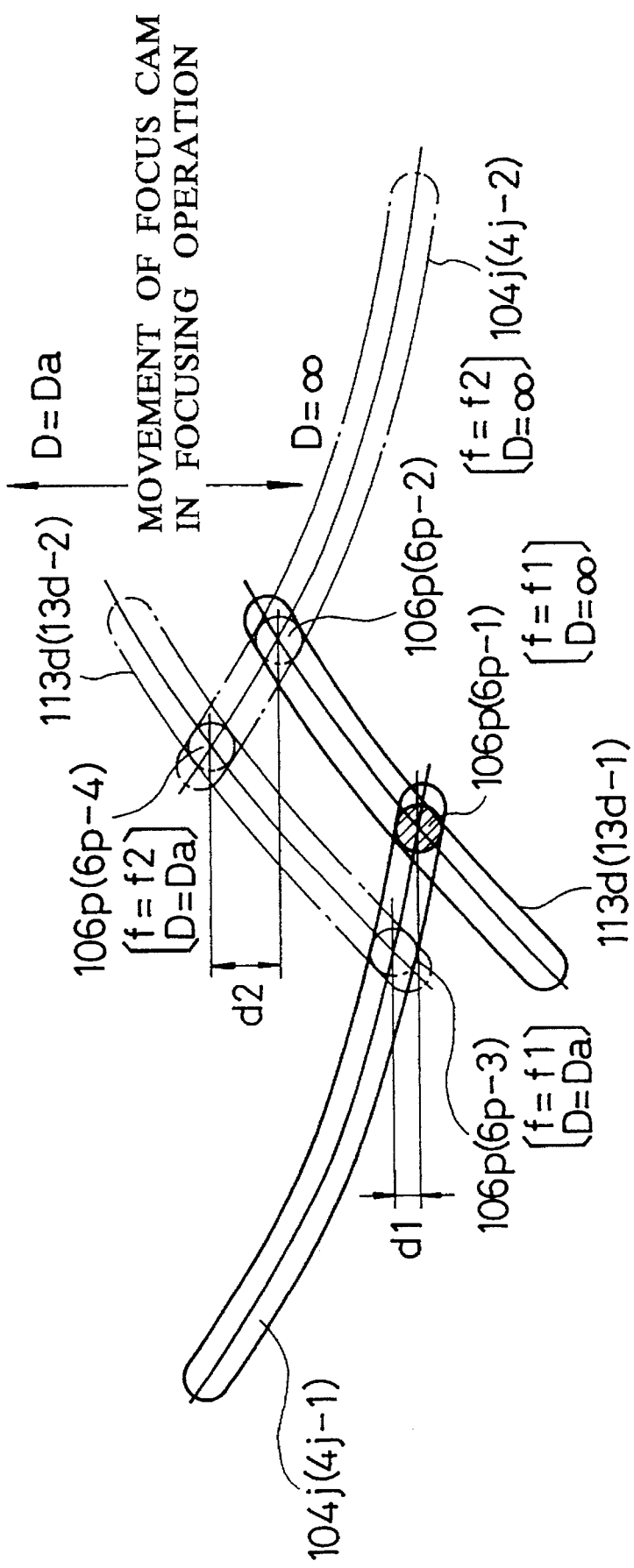
FIG. 19 is a diagram explaining the positional relation between the focus cam and zoom cam of the second lens set.

In FIG. 19, the solid line shows the position 4j-1 of the cam groove 104j of the zoom cam ring 104 and the position 13d-1 of the cam groove 113d of the focus cam ring 113 when focal length f is set to the wide-angle extreme f1 and the object distance D is set to the infinity position (D=∞). The dash-dot line shows the position 4j-2 of the cam groove 104j of the zoom cam ring 104 and the position 13d-2 of the cam groove 113d of the focus cam ring 113 when focal length f is set to the telephoto extreme f2 and the object distance D is set to the closest position (D=Da).

Namely, in the zooming operation, with the object distance D being set to the infinity position (D=∞) and the focal length f being set to the wide-angle extreme f1, the operation of the zoom cam ring 104 toward the telephoto position causes the cam groove 104j of the zoom cam ring 104 to move from position 4j-1 to position 4j-2 (rightward in FIG. 19). The focus cam ring 113 does not move at this time, and the pin 106p moves from position 6p-1 to position 6p-2 to implement the zooming.

In the focusing operation, with the focal length f being set to the wide-angle extreme f1 and the object distance D being set to the infinity position (D=∞), the operation of the focus cam ring 113 toward the closer distance causes the cam groove 113d of the focus cam ring 113 to move from position 13d-1 to position 13d-2 (upward in FIG. 19). The focus cam ring 104 does not move at this time, and the pin 106p moves from position 6p-1 to position 6p-3 (displacement d=d1) to implement the intended focusing.

With the focal length f being set to the telephoto extreme f2 and the object distance D being set to the infinity position (D=∞), the operation of the focus cam ring 113 toward the closer distance causes the cam groove 113d of the focus cam ring 113 to move from position 13d-1 to position 13d-2 (upward in FIG. 19). The zoom cam ring 104 does not move at this time, and the pin 106p moves from position 6p-2 to position 6p-4 (displacement d=d2) to implement the intended focusing.

Although the amount of movement of the focus cam ring 113 from the infinity position (D=∞) to the closest position (D=Da) is constant, the amount of displacement of the pin 106p, i.e., the second lens set L2, is d=d1 for the focal length f set to the wide-angle extreme, or it is d=d2 for the f set to the telephoto extreme f2, and accordingly the amount of displacement of the second lens set L2 is modified depending on the object distance.

For example, with the object distance D being set to the closest position (D=Da), when the zoom cam ring 104 is turned from the wide-angle extreme f1 to the telephoto extreme f2, the pin 106p moves from position 6p-3 to 6p-4 to provide a displacement of d=d2 for the second lens set L2, and consequently the in-focus condition is not disturbed by the zooming operation.

As described above, the inventive zoom lens, although it is based on the vari-focal optical system, implements the focus modification by operating on the focus cam to move the focus-related lens sets during the zooming operation, and therefore it can be used in completely the same manner as usual zoom lenses.

The focus modification function of the inventive zoom lens, which has been explained for the cases of the focal length f set to the wide-angle extreme f1 or telephoto extreme f2 and the object distance D set to the infinity or closest position Da, is equally applied to the modification of displacement of the second lens set L2 when the f and D are set to intermediate values.

(3) Detection of lens position with MR sensor

For the detection of position of the second lens set L2 which is moved during the focusing operation, a position detector based on the ferromagnetic thin-film magnetic resistance (will be termed "MR sensor" hereinafter) is attached on the focus cam ring 113 and a magnetized rod 122 having N and S poles at a certain spacing is attached on the inner fixed tube 103.

Figure 20:
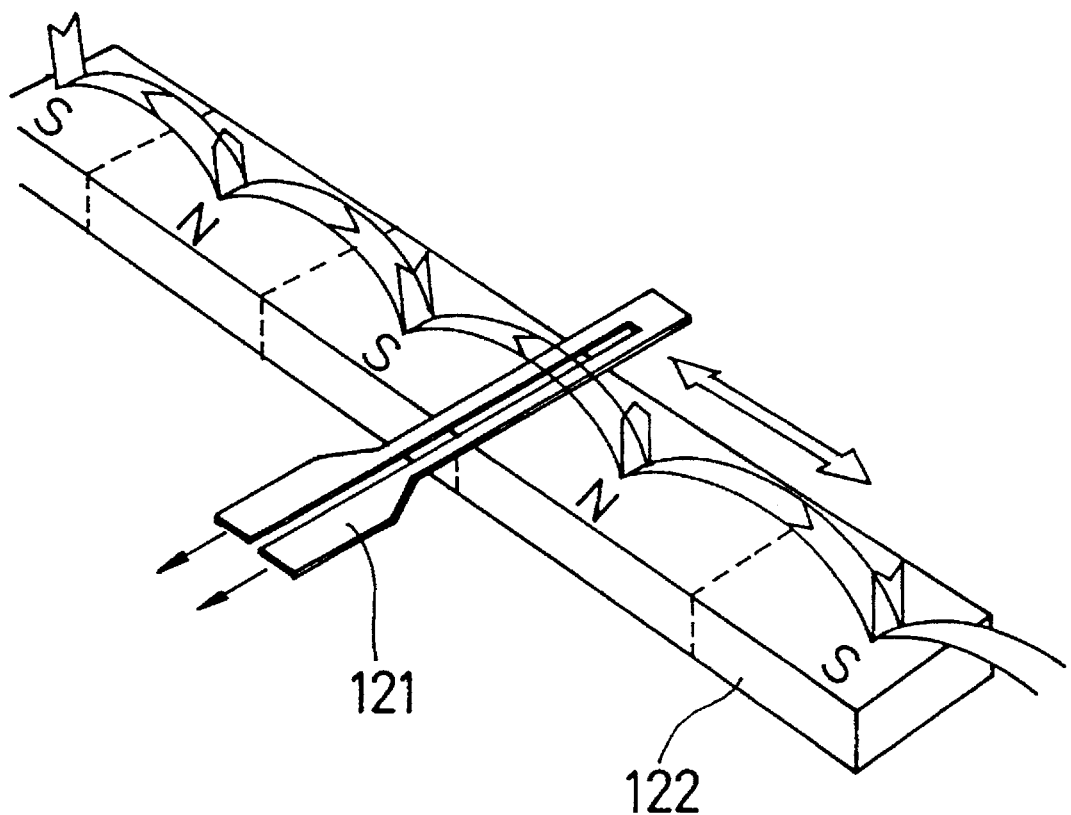
FIG. 20 is a diagram used to explain the position detector based on the ferromagnetic thin-film magnetic resistance (MR sensor)

The MR sensor is a non-contact position detector used for the measurement of a relatively long traveling distance or the position of an object, and it consists of a magnetized rod 122 and a magnetic resistance element 121. The principle of the MR sensor will be explained with reference to FIG. 20.

Over a magnetized rod 122 having N and S poles aligned at a certain spacing along the measuring direction, a magnetic resistance element 121 is disposed such that the axis of current is at right angles with the magnetic pole alignment and the element face is in parallel and close to the surface of the magnetized rod. The leakage magnetic flux emerging between each pair of magnetic poles acts on the magnetic resistance element 121, which then behaves the magnetic resistance effect as follows.

When the magnetic resistance element 121 is located between two poles of the magnetized rod 122, its resistance value decreases due to the magnetic resistance effect attributable to the horizontal component of the leakage magnetic flux, whereas when it is located right above a pole, the resistance value is the same as the case of no magnetic field because of the absence of horizontal component of the leakage magnetic flux over the magnetic pole. The relative movement between the magnetic resistance element 121 and magnetized rod 122 creates a periodic variation of resistance of the magnetic resistance element 121, and accordingly the distance of movement and thus the position of the element 121 can be known by counting resistance variation cycles.

Figure 21:
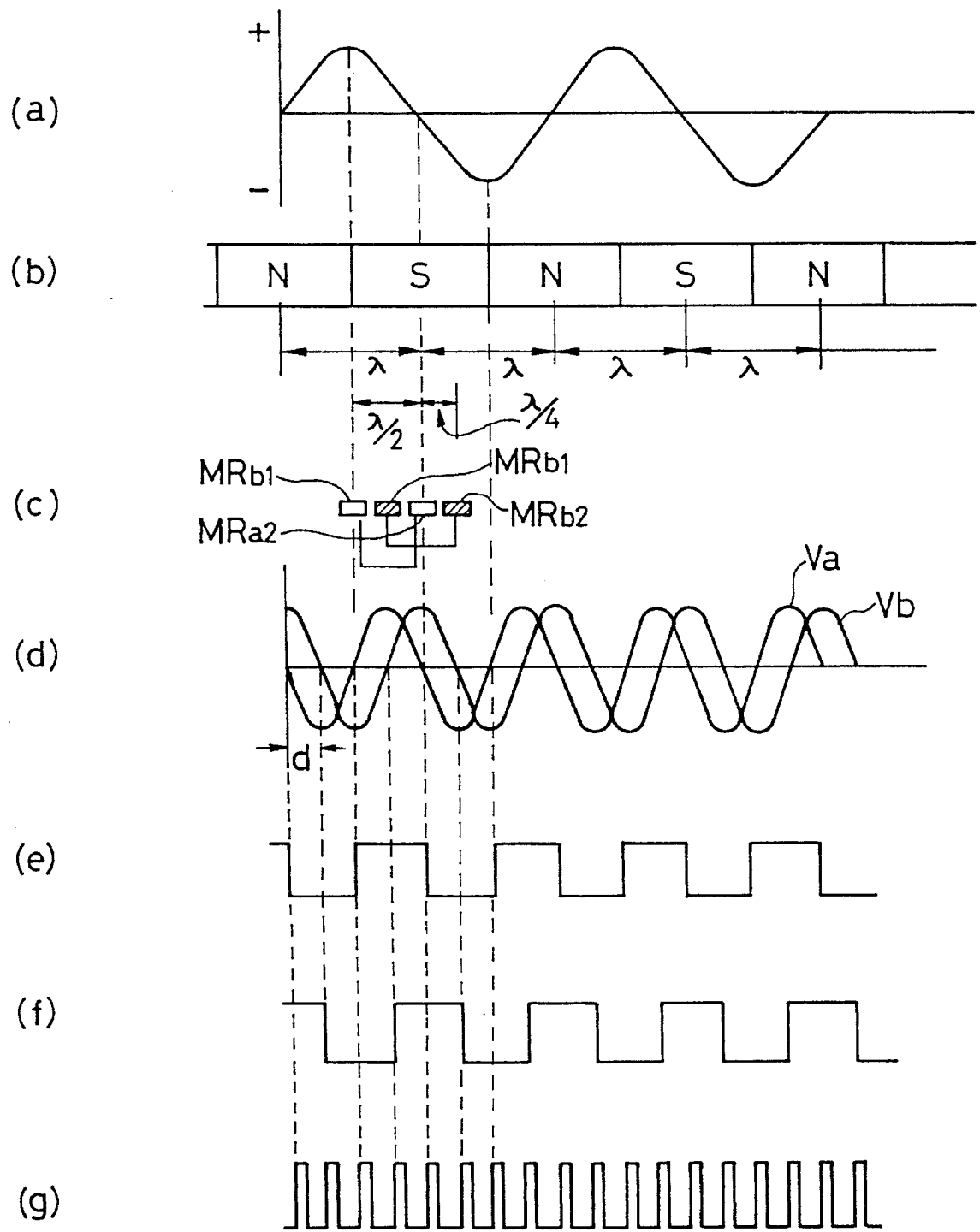
FIG. 21 is diagram showing the magnetic poles of the magnetized rods, the disposition of the magnetic resistance elements and the output of the MR sensor.

FIG. 21 explains the positional relation between the magnetic resistance element 121 and magnetic poles of the magnetized rod 122, and the output signals. Magnetic poles N and S of the magnetized rod 122 have a constant spacing $\lambda$ as shown by (a) and (b) of FIG. 21, and the resolution of measurement is determined from the dimension of spacing $\lambda$ between adjacent N and S poles.

The magnetic resistance element 121 is made up of an a-group element pair MRa1 and MRa2 spaced out by $\lambda/2$ and a b-group element pair MRb1 and MRb2 spaced out by $\lambda/2$, with these element pairs being phased spatially by d (d=$\lambda/4$) as shown by (c) of FIG. 21.

Figure 22:
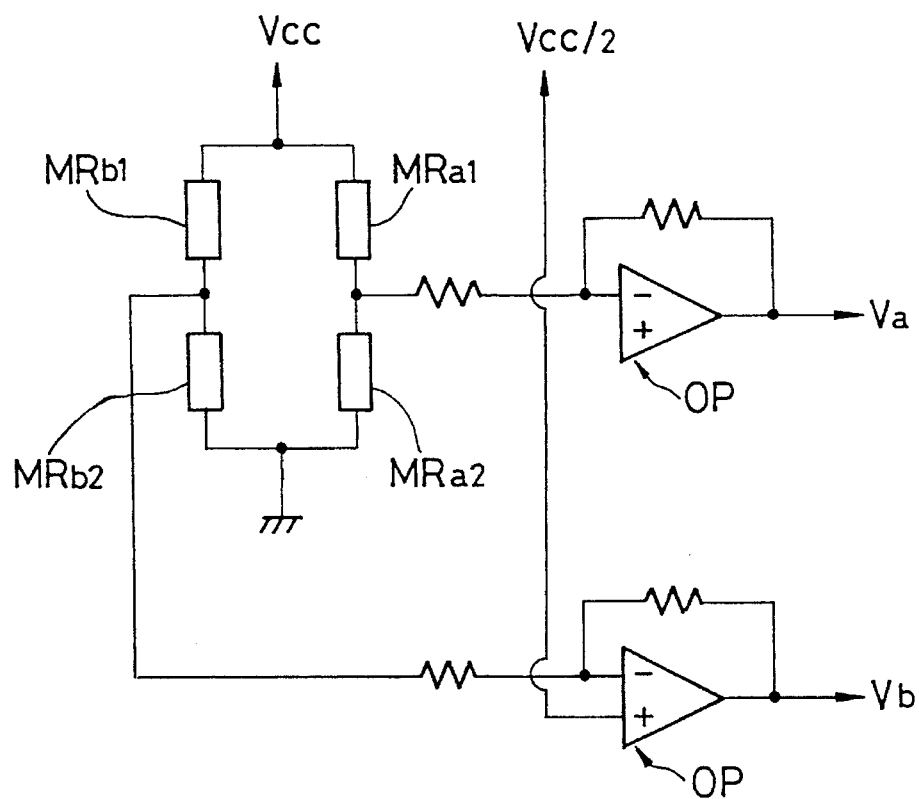
FIG. 22 is a schematic diagram of the signal processing circuit for the outputs of MR sensor.

The a-group element pair MRa1 and MRa2 and b-group element pair MRb1 and MRb2 produce output signals Va and Vb which are out of phase by d as shown by (d) of FIG. 21. By processing these signals to discriminate the phase relationship with a signal processing circuit as shown in FIG. 22 for example, the moving direction can be known.

The output signals Va and Vb are shaped into pulse signals as shown by (e) and (f) of FIG. 21, and then merged into a pulse train having a pitch of $\lambda/4$ as shown by (g) of FIG. 21, and by counting the pulses, the distance of movement can be measured at a resolution of a quarter of the pole spacing $\lambda$.

(4) Manual focusing mechanism

This zoom lens barrel employs a power-assisted focusing mechanism in which the rotational angle of the manual focus ring 114 (shown in FIG. 14) is detected electrically also in the manual focusing operation and the piezo-electric actuator 112 is energized to move the focus cam ring 113 in the axial direction.

Figure 23:
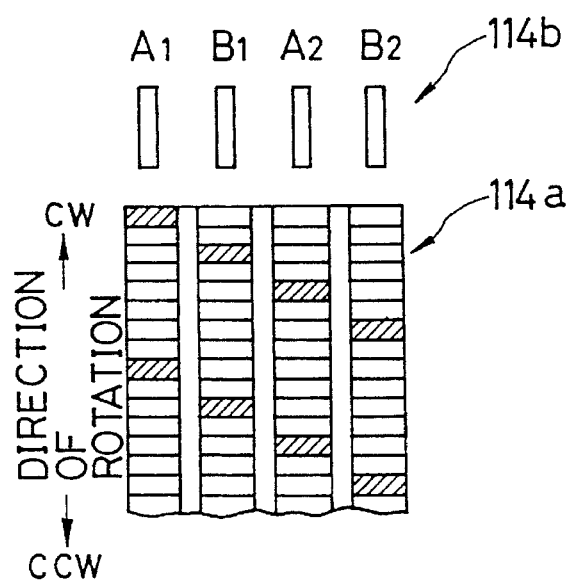
FIG. 23 is a diagram showing by developing the pattern encoder formed on the manual focus ring.

Specifically, for the detection of rotational angle of the manual focus ring 114, a pattern encoder 114a is attached on the outer lens tube 101 and a brush 114b in contact with the encoder 114a (hatched pattern is conductive part) is attached on the ring 114. The use of a pattern encoder as shown in FIG. 23, for example, enables the detection of rotational angle in the form of a 4-bit pulse signal. The produced 4-bit pulse signal is processed by a logical processing circuit shown in FIG. 24, and the circuit yields signals indicative of the rotational direction and rotational angle of the manual focus ring.

Figure 24:
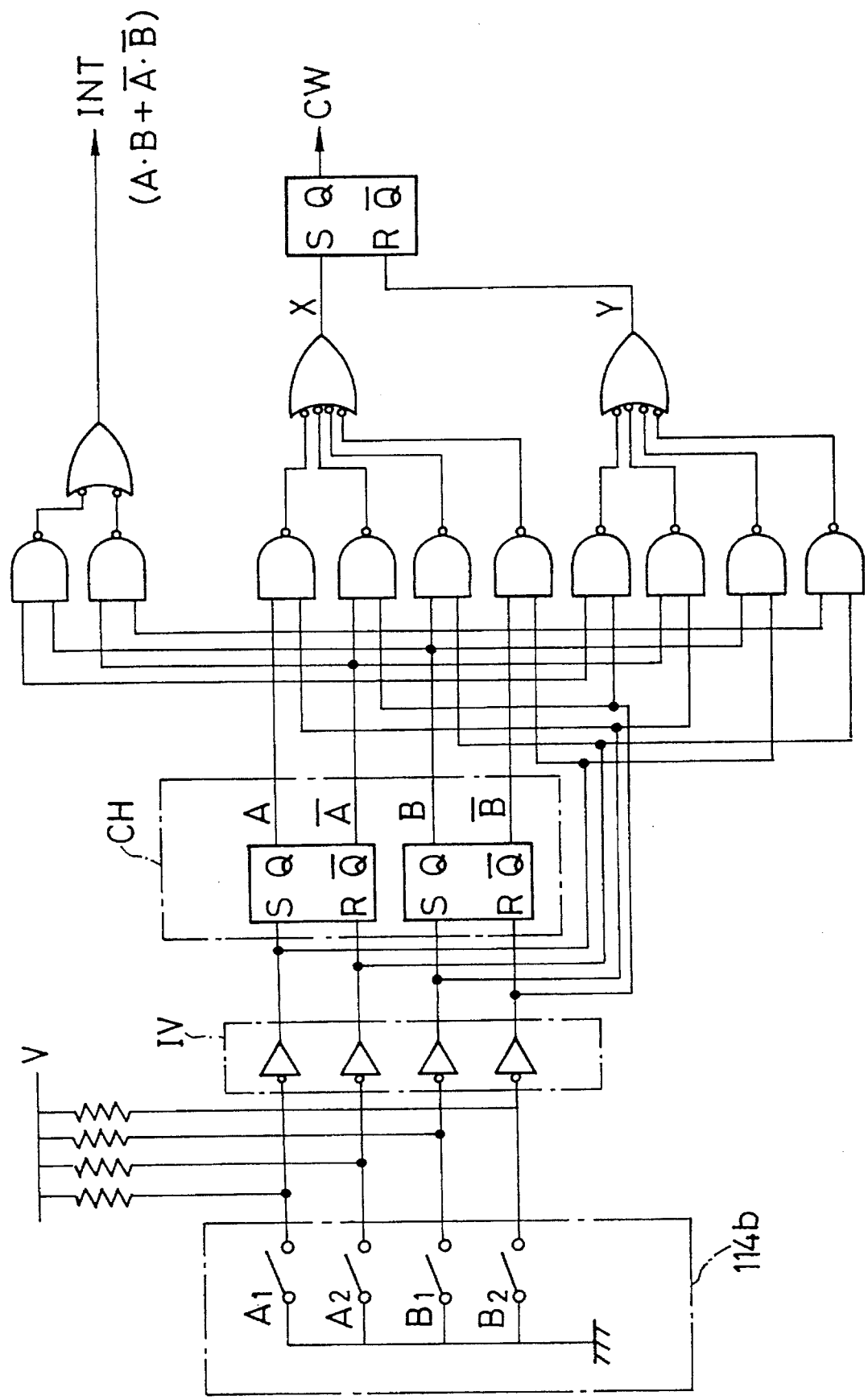
FIG. 24 is a schematic diagram of the logical processing circuit for the outputs of the encoder attached on the manual focus ring.
Figure 25:
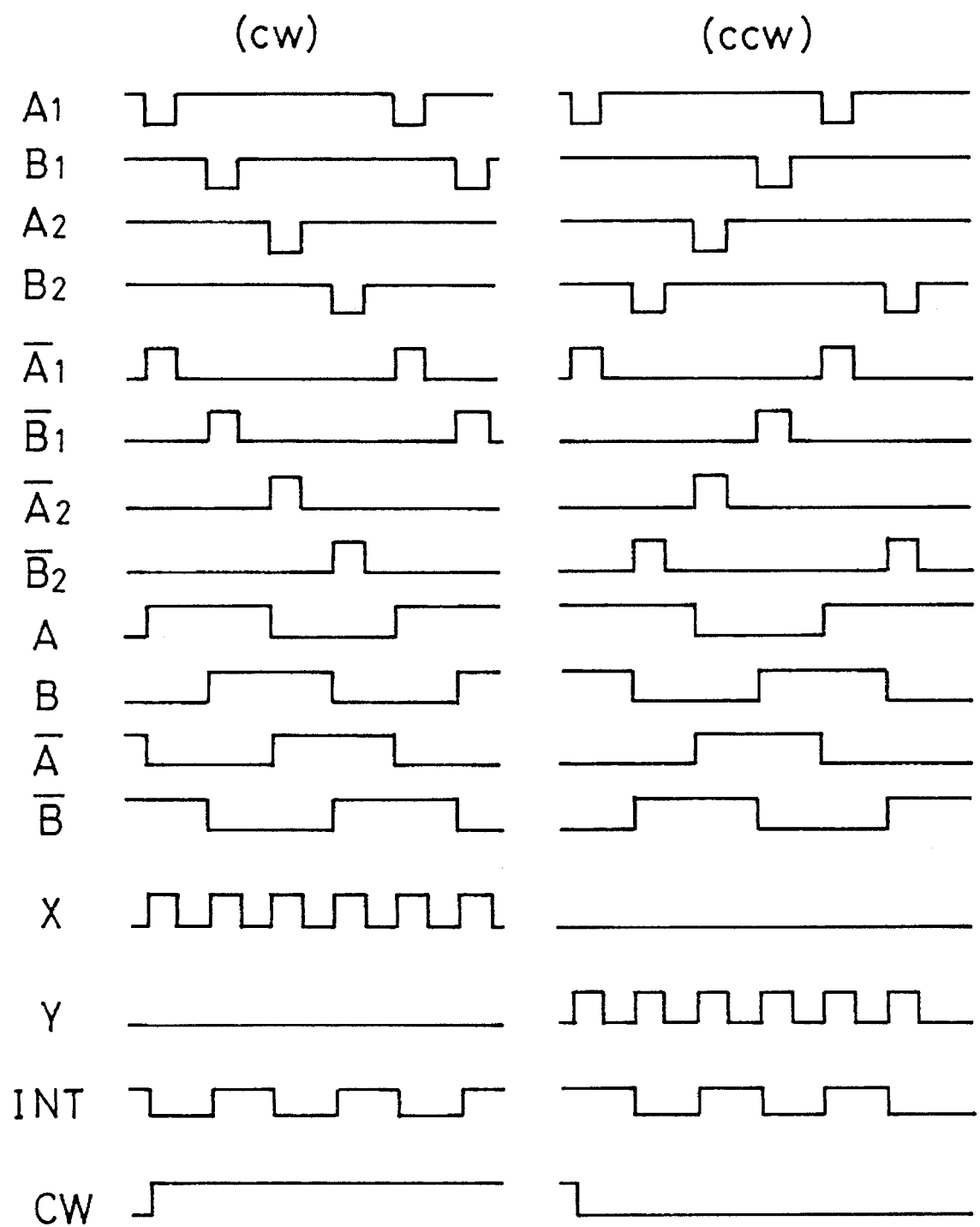
FIG. 25 is a diagram showing the output waveforms of the logical processing circuit shown in FIG. 24.

FIG. 25 shows the signal waveforms resulting from the process by the logical processing circuit of FIG. 24. The signals include the output signals A1, B1, A2 and B2 of the four brushes 114b that are in contact with the pattern encoder, the output signals A1, B1, A2 and B2 of the inverter gate IV, the output signals A, $\overline{A}$, B and $\overline{B}$ of the chattering preventive circuit CH consisting of two flip-flops, the output signals X and Y of the logic circuit consisting of AND gates, OR gates and a flip-flop, and the output signals CW and INT indicative of the rotational direction and rotational angle of each of clockwise rotation (CW) and counterclockwise rotation (CCW).

(5) Lens barrel control circuit and control operation

Figure 26:
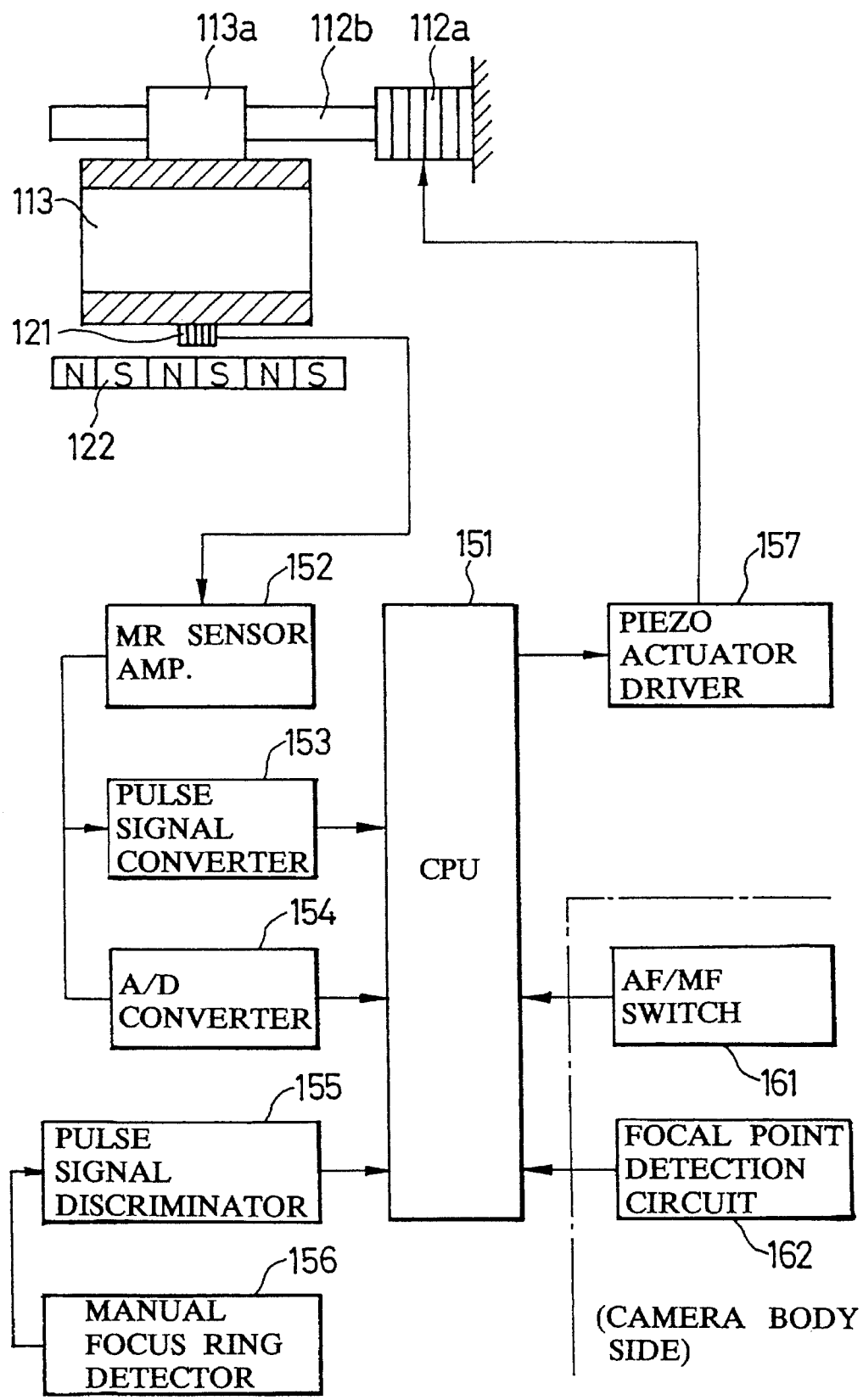
FIG. 26 is a block diagram showing the control circuit of the zoom lens barrel.

FIG. 26 is a block diagram of the lens barrel control circuit. The circuit includes a controller 151 formed of a CPU device, an MR sensor amplifier 152, a threshold circuit 153 which shapes the output signal of the amplifier, an A/D converter 154, a manual focus ring detector 156 and a pulse signal discriminator 155 which processes the output signal of the detector 156, all connected to the input ports of the controller 151, and a piezo-electric actuator driver 157 connected to the output port of the controller 151. An AF/MF switch 161 for selecting the auto-focus or manual focus mode and a focal point detection circuit 162, both included on the part of the camera body (not shown), are also connected to the input ports of the controller 151.

Next, the operation of the control circuit for focusing the zoom lens to a photographic object will be explained with reference to FIG. 26, FIG. 14 and FIG. 15.

Initially, the controller 151 receives the signal from the AF/MF switch 161 on the camera body, and detects that the switch is set to the AF position for auto-focusing, for example. The controller 151 also receives the defocus signal for the object sent from the focal point detecting circuit 162 in the camera body.

The controller 151 discriminates the defocus signal, and upon detecting that the lens set L2, i.e., the focus cam ring 113, needs to be moved forward (indicated by the arrow mark "a" in FIG. 14), it operates on the piezo-electric actuator driver 157 to generate drive pulses having a moderate rising edge and a sharp falling edge as shown in FIG. 16 thereby to energize the piezo-electric element 112a.

The piezo-electric element 112a extends moderately in its thickness direction during the period of the moderate rising edge of the drive pulse, causing the drive shaft 112b to move forward as shown by the arrow mark "a" in FIG. 15. Consequently, the focus cam ring 113, which is in friction-fitting on the drive shaft 112b by means of the contactor 113a, moves in the direction "a" to move the lens set L2 forward.

The piezo-electric element 112a contracts quickly in its thickness direction during the period of the sharp falling edge of the drive pulse, causing the drive shaft 112b to move backward. In this case, the focus cam ring 113 has the inertia that is large enough to defeat the frictional force on the drive shaft 112b and it is virtually stationary at its position, and the focus cam ring 113 does not move. The expression of the "virtually stationary" focus cam ring 113 mentioned here disregards a momentary slip movement between the contactor 113a and drive shaft 112b in both directions, and the focus cam ring 113 is moved forward throughout the period of drive pulse application to the piezo-electric element 112a.

The focus cam ring 113 is moved backward by the the application of drive pulses having a sharp rising edge and a moderate falling edge to the piezo-electric element 112a.

As the focus cam ring 113 moves, the magnetic resistance element 121 of the MR sensor attached on the focus cam ring 113 is sensitive to the magnetic poles of the magnetic rod 122 attached on the inner fixed tube 103. The detected signals are amplified by the MR sensor amplifier 152, converted into pulse signals by the threshold circuit 153, and fed to the controller 151. The amplified signals are also delivered to the A/D converter 154, by which the signals are converted into digital data and fed to the controller 151. The controller 151 implements the calculation of interpolation for the digital data to evaluate the cam position between adjacent magnetic poles, thereby determining the position of the focus cam ring 113 precisely over the entire moving range.

The focus detecting circuit 162 in the camera body detects the in-focus state and sends a signal to the controller 151. In response to the signal, the controller 151 operates on the piezo-electric actuator driver 157 to cease the output of drive pulses, and the focus cam ring 113 stops.

Next, the control operation when the AF/MF switch 161 on the camera body is set to the MF position for manual focusing will be explained. When the manual focus ring 114 is operated, the rotation is detected by the manual focus ring detector 156 made up of the pattern encoder 114a and brush 114b. The resulting pulse signals are processed by the logical processing circuit 155, which then produces the signals CW and INT indicative of the direction of operation and the amount of operation of the manual focus ring 114.

Based on these signals, the controller 151 operates on the piezo-electric actuator driver 157 to generate drive pulses having a moderate rising edge and a sharp falling edge, or drive pulses having a sharp rising edge and a moderate falling edge, thereby energizing the piezo-electric actuator.

As described above, the inventive zoom lens barrel based on the vari-focal optical system has its cam rings separated for zooming and focusing, with the zoom cam ring being supported only rotatably with respect to its supporting member and the focus cam ring being supported movably only axially with respect to the fixed tube. Consequently, it allows the same focusing operation as the usual zoom lens, while eliminating the interference between focusing and zooming.

The fixed tube is rid of the formation of a complex and precisely shaped zoom cam, and its structure can be simplified. This enables the fixed tube to be formed as an injected part, and the metal mold for it can also be manufactured at a low cost.

In the case of the arrangement including the electro-mechanical actuator which moves the focus cam ring directly in the axial direction for the focusing operation of the lens sets that contribute to the zooming and focusing of the zoom lens, it becomes possible to eliminate the complicated mechanism for converting the rotation of the helicoid ring into the axial movement by means of a helicoid screw, which is the case of the conventional zoom lens. Consequently, the lens drive mechanism can be simplified, the number of component parts can be reduced, and the weight of the camera can be reduced.

While there have been described preferred embodiments of the present invention, it will be apparent for those skilled in the art that changes and modifications can be made within the spirit and scope of the present invention as defined by the appended claims.

What is claimed is:

1. A lens barrel comprising:

a zooming optical system which varies the focal length by moving along the optical axis;

a focal point adjusting optical system which implements focusing by moving along the optical axis; and a drive mechanism which moves said focal point adjusting optical system based on the mechanical operation caused by the movement of said zooming optical system, wherein said lens barrel further includes:

a fixed tube;

a zoom cam ring which is supported to move only rotatably about the optical axis with respect to said fixed tube;

a focus cam ring which is linearly movable along the optical axis with respect to said fixed tube; and an inhibition mechanism which inhibits said focus cam ring from rotating about the optical axis with respect to said fixed tube.

2. A lens barrel according to claim 1, wherein said focus cam ring is moved manually.

3. A lens barrel according to claim 1, wherein said focus cam ring is moved by means of an electric actuator.

4. A lens barrel according to claim 3, wherein said actuator comprises a motor.

5. A lens barrel according to claim 3, wherein said actuator comprises a piezo-electric element.

6. A lens barrel according to claim 5 further including:

a guide member whose position is varied in response to the extension or contraction of said piezo-electric element caused by the application of a voltage; and a driven member which is frictionally joined to said guide member and engaged with said focal point adjusting optical system, said guide member varying its position at different speeds in one direction and another due to different speeds of extension and contraction of said piezo-electric element, causing said driven member to move in the direction of extension or contraction of said piezo-electric element.

7. A lens barrel according to claim 6, wherein said driven member is said focus cam ring.

8. A lens barrel comprising:

a zooming optical system which varies the focal length by moving along the optical axis;

a focal point adjusting optical system which implements focusing by moving along the optical axis; and a drive mechanism which moves said focal point adjusting optical system based on the mechanical operation caused by the movement of said zooming optical system, wherein said lens barrel further includes:

a fixed tube;

an arcuate zoom member which is supported to move only rotatably about the optical axis with respect to said fixed rube;

an arcuate focus member which is linearly movable along the optical axis with respect to said fixed tube; and an inhibition mechanism which inhibits said arcuate focus member from rotating about the optical axis with respect to said fixed tube.

9. A lens barrel according to claim 8, wherein said arcuate focus member is manually movable.

10. A lens barrel according to claim 8, wherein said arcuate focus member is moved by means of an electric actuator.

11. A lens barrel according to claim 10, wherein said actuator comprises a motor.

12. A lens barrel according to claim 10, wherein said actuator comprises a piezo-electric element.

13. A lens barrel according to claim 12 further including:

a guide member whose position is varied in response to extension and contraction of said piezo-electric element caused by the application of a voltage; and a driven member which is frictionally joined to said guide member and engaged with said focal point adjusting optical system, said guide member varying its position at different speeds in one direction and another due to different speeds of extension and contraction of said piezo-electric element, causing said driven member to move in the direction of extension or contraction of said piezo-electric element.

14. A lens barrel according to claim 13, wherein said driven member is said arcuate focus member.

15. A lens barrel according to claim 8, wherein said arcuate zoom member is a ring-shaped member.

16. A lens barrel according to claim 8, wherein said arcuate focus member is a ring-shaped member.

* * * * *